US010622618B2

(12) United States Patent
Qian et al.

(10) Patent No.: US 10,622,618 B2
(45) Date of Patent: Apr. 14, 2020

(54) $MnO_2$ ANODE FOR LI-ION AND NA-ION BATTERIES

(71) Applicant: THE HONG KONG POLYTECHNIC UNIVERSITY, Hong Kong (HK)

(72) Inventors: Jiasheng Qian, Hong Kong (HK); Shu Ping Lau, Hong Kong (HK)

(73) Assignee: The Hong Kong Polytechnic University, Hong Kong (HK)

( * ) Notice: Subject to any disclaimer, the term of this patent is extended or adjusted under 35 U.S.C. 154(b) by 270 days.

(21) Appl. No.: 15/603,136

(22) Filed: May 23, 2017

(65) Prior Publication Data

US 2018/0342730 A1 Nov. 29, 2018

(51) Int. Cl.

| | |
|---|---|
| *H01M 4/131* | (2010.01) |
| *H01M 4/1391* | (2010.01) |
| *H01M 4/04* | (2006.01) |
| *H01M 4/50* | (2010.01) |
| *H01M 4/38* | (2006.01) |
| *H01M 4/66* | (2006.01) |
| *H01M 10/0525* | (2010.01) |
| *H01M 10/054* | (2010.01) |
| *H01M 10/0569* | (2010.01) |
| *H01M 10/0568* | (2010.01) |

(52) U.S. Cl.
CPC ......... *H01M 4/131* (2013.01); *H01M 4/0471* (2013.01); *H01M 4/1391* (2013.01); *H01M 4/382* (2013.01); *H01M 4/502* (2013.01); *H01M 4/661* (2013.01); *H01M 4/663* (2013.01); *H01M 4/0404* (2013.01); *H01M 10/054* (2013.01); *H01M 10/0525* (2013.01); *H01M 10/0568* (2013.01); *H01M 10/0569* (2013.01); *H01M 2300/0034* (2013.01); *H01M 2300/0037* (2013.01)

(58) Field of Classification Search
None
See application file for complete search history.

(56) References Cited

U.S. PATENT DOCUMENTS

2007/0037058 A1* 2/2007 Visco ............... H01B 1/122
429/246

OTHER PUBLICATIONS

Wang et al. (Chem. Mater. 2003, 15, 2873-2878). (Year: 2003).*
(Continued)

*Primary Examiner* — Wojciech Haske
(74) *Attorney, Agent, or Firm* — Mintz Levin Cohn Ferris Glovsky and Popeo, P.C.; Joohee Lee

(57) ABSTRACT

In the present invention there is provided an $MnO_2$ electrode with improved electrochemical properties, and a method of preparation of an electrode, wherein there anode comprises a substrate at least partially coated with $MnO_2$ nanosheets (MnNSs) forming additive free $MnO_2$ thin films. The method includes providing $MnO_2$ nanosheets (MnNSs) suspension with diameters less than 50 nm; printing the MnNSs suspension on substrates to form $MnO_2$ thin films (MnTFs); and annealing the MnTFs at 260-320° C. for at least 100 minutes. Energy storage device comprising the $MnO_2$ electrode such as a Na-ion cell, and a Li-ion cell are also described.

26 Claims, 25 Drawing Sheets
(16 of 25 Drawing Sheet(s) Filed in Color)

(56) References Cited

OTHER PUBLICATIONS

Kai et al. (J. Am. Chem. Soc. 2008, 130,15938-15943) (Year: 2008).*

Supporting Information in the referenceQian et al. (Angew. Chem. Int. Ed. 2015, 54, 6800-6803) (Year: 2015).*

He et al., "Monodisperse Antimony Nanocrystals for High-Rate Li-ion and Na-ion Battery Anodes: Nano versus Bulk," *Nano Lett.* 14(3):1255-1262, 2014.

Hyun et al., "High-Resolution Patterning of Graphene by Screen Printing with a Silicon Stencil for Highly Flexible Printed Electronics," *Adv. Mater.* 27(1):109-115, 2015.

Li et al., "Graphene-Wrapped $MnO_2$-Graphene Nanoribbons as Anode Materials for High-Performance Lithium Ion Batteries," *Adv. Mater.* 25(43):6298-6302, 2013.

Qian et al., "Aqueous Manganese Dioxide Ink for Paper-Based Capacitive Energy Storage Devices," *Angew. Chem. Int. Ed.* 54(23):6800-6803, 2015.

Sousa et al., "High performance screen printable lithium-ion battery cathode ink based on C—$LiFePO_4$," *Electrochimica Acta* 196:92-100, 2016.

Suga et al., "Photocrosslinked nitroxide polymer cathode-active materials for application in an organic-based paper battery," *Chem. Commun.* 17:1730-1732, 2007.

Wang et al., "Development of $MnO_2$ cathode inks for flexographically printed rechargeable zinc-based battery," *Journal of Power Sources* 268:246-254, 2014.

Wang et al., "Spray-Painted Binder-Free SnSe Electrodes for High-Performance Energy-Storage Devices," *ChemSusChem* 7(1):308-313, 2014.

Xu et al., "Highly stretchable polymer semiconductor films through the nanoconfinement effect," *Science* 355(6320):59-64, 2017.

Yu et al., "High-Performance Fiber-Shaped All-Solid-State Asymmetric Supercapacitors Based on Ultrathin $MnO_2$ Nanosheet / Carbon Fiber Cathodes for Wearable Electronics," *Adv. Energy Mater.* 6(2):1501458, 2016. (9 pages).

Zhao et al., "Synthesizing $MnO_2$ nanosheets from graphene oxide templates for high performance pseudosupercapacitors," *Chem. Sci.* 3:433-437, 2012.

Zhou et al., "Hollow Core-Shell $SnO_2$/C Fibers as Highly Stable Anodes for Lithium-Ion Batteries," *ACS Appl. Mater. Interfaces* 7:21472-21478, 2015.

* cited by examiner

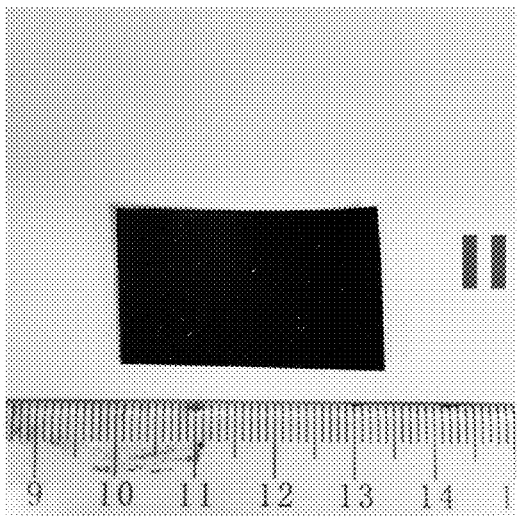 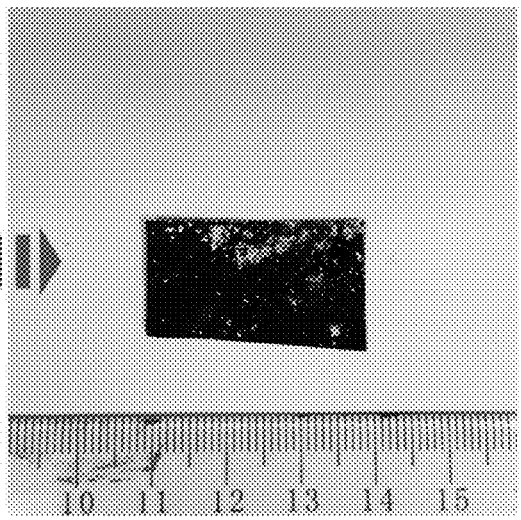
Figure 10A  Figure 10B
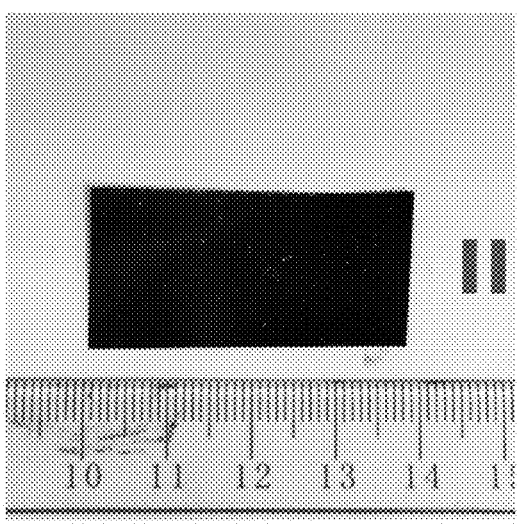 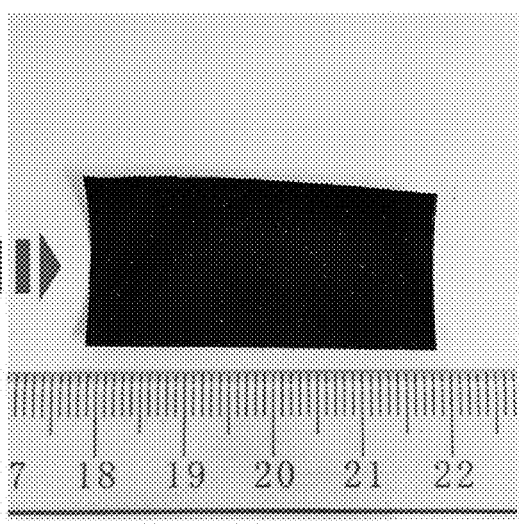
Figure 11A  Figure 11B

MNO₂ ANODE FOR LI-ION AND NA-ION BATTERIES

TECHNICAL FIELD

The present disclosure generally relates to improved $MnO_2$ electrodes, $MnO_2$ electrode based rechargeable Li-ion and Na-ion batteries, with improved electrochemical properties, as well as methods of preparation of the $MnO_2$ electrodes and batteries.

BACKGROUND

Description of the Related Art

Printable electronics is of great interest in applications ranging from thin film transistors (TFTs), energy storage devices, fuel cells, solar cells to integrated circuits. In particular, printable rechargeable batteries, mainly Li-ion or Na-ion batteries, have attracted attention due to their potential for use in portable electronic devices, wearable electronic clothing and implantable or patchable sensors.

In pursuit of a flexible and reliable power source, advances have been made toward using an all-printable-solution technology to replace the traditional slurry-coating process. To date, widespread mass-printing approaches, such as screen printing, stencil printing and spray printing have been employed, (Hyun, et al., Adv. Mater., 27(1): 109-115 (2015).)

However, in order to utilise these printing processes, the ink required for all the major components of the batteries, including electrolyte and two electrodes is critical. Many of researchers primarily worked on the composites or additive-assisted (e.g. conductive agents or polymeric binders) slurry or inks to control the rheological properties. (Sousa, et al., Electrochim. Acta 196: 92-100 (2016).)

However, the electrodes typically produced are vulnerable to common solvents (e.g. water, ethanol and acetone), and suffer from reduced electrical conductivity and require proper substrates, causing an increasing cost and time-consuming printing process, further imposing great challenges on cell manufacturing. Hence, the development of high-efficient and large-scale printable electrodes is highly desirable for rechargeable batteries.

In addition due to about 55% larger in radius of Na ions as compared to Li ions, the reversible insertion/desertion of Na ions from the host materials is expected to be relatively more difficult. Few materials systems have been reported to date which could serve the anodes for both Li-ion and Na-ion batteries. (He, et at, Nano Lett. 14(3): 1255-1262 (2014).)

As a member of transition metal oxides (TMOs) family, manganese dioxide ($MnO_2$) is known as an ideal candidate for the electrode materials of energy storage devices owing to its abundance, non-toxicity, high theoretical capacity, high voltage and environmental compatibility, Specially, nanostructured $MnO_2$ has been proved as a versatile candidate for the anodes of both Li-ion and Na-ion batteries. However, due to the large specific volume variations and low electrical conductivity, $MnO_2$-based electrodes typically suffer from poor cycling performance and rate capability. Additives are widely used in battery electrodes (whatever cathode or anode) since many electro-active materials are not able to adhere to the common used substrates by themselves. Commonly used binders are polymers such as PTFE, PVDF or CMC. However, such binders demonstrate poor electrical conductivity. Accordingly, in an attempt to compensate for the decrease of conductivity, conductive agents such as carbon black are used.

Without these additives, conventional electrodes cannot be prepared. Furthermore, even novel materials generally cannot adhere to the substrates by themselves and the binder and conductive agents are frequently used. For example, L. Li, et at, Adv. Mater., 25, 6298-6302 (2013) teaches that at least conducting agent is required or even combined with carbon to form composite.

The inclusion of additives increases the cost and complicates the preparation process, as well as greatly decreasing the conductivity of the electrode materials. Hence, the inclusion of additives is undesirable. For example, traditional $MnO_2$ anode (formed with $MnO_2$, carbon, and binder) can only reach a capacity of <400 mAh·g−1.

Attempts to produce an additive-free electrode have included in-situ growth or chemical deposition on the substrates directly. However, these approaches also meet other challenges. And few works were reported for additive free printing process as described in e.g. Z. Wang, et al. J. Power Sources 268, 246-254 (2014); R. E. Sousa, et al., Electrochim. Acta 196, 92-100 (2016) and X. Wang, et al., Chem Sus Chem, 7, 308-313 (2014).

Successful applications of pure $MnO_2$ electrodes (i.e., additive-free $MnO_2$ electrodes) have not been reported due to the large specific volume variations and low electrical conductivity. Despite mixing with conducting agent, current $MnO_2$-based electrodes still suffer from poor cycling performance and rate capability. (Zhou, et al., ACS Appl. Mater. Interfaces 7(38): 21472-21478 (2015).)

It is known that, generally, commercially available $MnO_2$ has an electrical conductivity of $10^{-5}$-$10^{-6}$ S·cm$^{-1}$ (Adv. Energy Mater., 6, 1501458 (2016)), while a typical conductor like graphene could be at least >1 S·cm$^{-1}$.

Therefore, it is an object of the disclosure to provide an additive-free $MnO_2$ electrode/cell with improved electrical performance, suitable for use in Lithium ion and Sodium ion based batteries.

BRIEF SUMMARY

An $MnO_2$ electrode comprising a substrate at least partially coated with $MnO_2$ nanosheets (MnNSs) forming additive free $MnO_2$ thin films, an energy device comprising thereof, and methods of making and using thereof are described herein. Preferably, the substrate can be selected from the group consisting of copper foil, carbon fiber cloth, stainless steel, graphene foam, copper foam, aluminium foil and carbon fiber cloth.

If the substrate is copper foam, copper foil or graphene foam, and the $MnO_2$ thin films are typically annealed at 260-320° C. and preferably 275-310° C., and most preferably at 290-300° C. in vacuum for at least 100 minutes and preferably 110-130 minutes, and most preferably at 115-125 minutes. If the substrate is stainless steel or carbon fiber cloth (carbon fabrics), and the $MnO_2$ thin films are typically annealed at 260-320° C. and preferably 275-310° C., and most preferably at 290-300° C. in air for at least 100 minutes and preferably 110-130 minutes, and most preferably at 115-125 minutes.

In preparing the $MnO_2$ electrode, the substrate can be coated by either drop coating, spray printing or inkjet printing with $MnO_2$ nanosheets. In an embodiment, the $MnO_2$ nanosheets suspension have diameters less than 50 nm.

The present disclosures further provides a method of preparing a $MnO_2$ electrode, which involves the steps of providing MnO₂ nanosheets (MnNSs) suspension with diameters less than 50 nm; printing the MnNSs suspension on substrates to form MnO₂ thin films (MnTFs); and annealing the MnTFs at 260-320° C. for at least 100 minutes. Printing method that can be utilized include drop coating, spray printing and inkjet printing, and the printing speed may be within the range of 80-200 cm/minute, and optionally performed at 35° C. The annealing duration time are typically 115-125 minutes.

In an embodiment, the substrate used in the method is selected from a group consisting of copper foil, copper foam, aluminium foil, graphene foam, carbon fibers (carbon fiber cloth), titanium foil, and stainless steel. If the substrate is copper foam, copper foil or graphene foam, the MnO₂ thin films are typically annealed at 260-320° C. and preferably 275-310° C., and most preferably at 290-300° C. in vacuum for at least 100 minutes and preferably 110-130 minutes, and most preferably at 115-125 minutes. If the substrate is stainless steel or carbon fiber cloth (carbon fabrics), the MnO₂ thin films are typically annealed at 260-320° C. and preferably 275-310° C., and most preferably at 290-300° C. in air for at least 100 minutes and preferably 110-130 minutes, and most preferably at 115-125 minutes.

The method may comprise the step of including the annealed MnO₂ electrode in a battery, such as a Li-ion coin cell or a Na-ion coin cell.

In another embodiment, a Li-ion cell comprising the MnO₂ electrode of the present disclosures, a Li metal cathode, and Li-containing electrolyte is provided. The MnO₂ electrode in the Li-ion cell can be obtained by the method of the present disclosures. The Li-containing electrolyte is selected from: 1.0 mol·L⁻¹ LiPF₆ in ethylene carbonate (EC) and dimethyl carbonate (DMC) (EC:DMC, 1:1 vol %), 1.0 mol·L⁻¹ LiPF₆ in EC/diethyl carbonate (DEC) (EC:DEC, 1:1 vol %), 0.5 mol·L⁻¹ LiCF₃SO₃ and 0.5 mol·L⁻¹ LiNO₃ in diethylene glycol dimethyl ether (DEGDME) as the electrolyte. The MnO₂ electrode in the Li-ion cell can be obtained by the method of the present disclosures.

In another embodiment, a Na-ion cell comprising the MnO₂ electrode of the present disclosures, a Na metal cathode and Na-containing electrolyte is provided. The MnO₂ electrode in the Na-ion cell can be obtained by the method of the present disclosures. The Na-containing electrolyte is selected from: 1.0 mol·L⁻¹ NaClO₄ s dissolved in propylene carbonate (PC) with addition of 5% fluoroethylene carbonate (FEC), 1.0 mol·L⁻¹ NaCF₃SO₃ dissolved in DEGDME, 1.0 mol·L⁻¹ NaCF₃SO₃ dissolved in ethylene carbonate and diethyl carbonate (EC/DEC), and 1.0 mol·L⁻¹ NaCF₃SO₃ dissolved in propylene carbonate (PC).

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 1B is a Selected Area Diffraction pattern for the MnO₂ nanosheets of FIG. 1a.

FIGS. 10A and 10B are optical photographs of the conventional MnO₂ thin films before and after washing (by using DI water, ethanol and acetone) and rubbing.

FIGS. 11A and 11B are optical photographs of the Cu—MnTFs before and after washing and rubbing.

DETAILED DESCRIPTION

Definitions

Figure 1A:
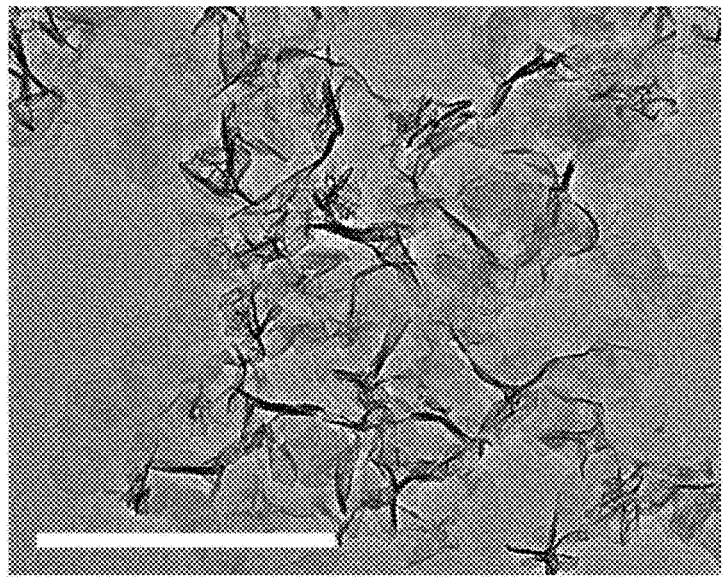
FIG. 1A depicts TEM images of the MnO₂ nanosheets. Scale bars are 200 nm for panel A.

"Substrate", as used herein, refers to the material on which the MnO$_2$ nanosheets (MnNSs) suspension is coated on, thereby forming MnO$_2$ thin film which can be directly used as MnO$_2$ electrode in a variety of energy storage devices. A variety of materials can be served as the substrate in the MnO$_2$ electrode. A person skilled in the art can envisage that any durable conductive materials can be served as substrates in battery, as long as the material does not react with other components in the battery. For instance, metals and carbon substrates may be used. Preferred substrates includes copper foil, carbon fiber cloth (carbon fabrics), stainless steel, graphene foam, copper foam, aluminium foil. The substrate may be treated by physical or chemical treatment prior to printing.

"MnO$_2$ nanosheets (MnNSs)", as used herein, refers to a two-dimensional nanostructure of MnO$_2$ with thickness in a scale ranging from 1 to 100 nm. Although MnO$_2$ nanosheets with nanoscale thickness and large area has been reported (G. Zhao et al, Chem. Sci., 3, 433 (2012)), the nanosheets described here distinguishes from the known MnO$_2$ nanosheets in that the MnO$_2$ nanosheets are in the nanoscale level for thickness, width, as well as length. The size of the MnO$_2$ nanosheets is between 1 to 200 nm in diameter, and preferably the diameter in the range of 30-70 nm, and more preferably in the range of 40-60 nm. Most preferably the diameter is <50 nm.

"Coating", as used herein, refers to any method for partially or entirely coating, or covering the surface of the substrate, thereby forming a thin layer of the coating material on the substrate (a conformal coating). For example, a dropper may be used to drop the MnO$_2$ suspension onto the substrate (drop coating) without the use of any machine. Other printing methods, e.g. spray-printing or inkjet printing could also be used for the coating process. With the increasing of the thickness of the coating, the mass loading will be increased, leading to higher total energy output that is suitable for practical applications. Meanwhile, the contact resistance will also increase. Hence, the thickness of the coating layer may be 0.1 μm-10 μm, and preferably 0.5 μm-5 μm, and more preferably 2-4 μm (mass loading: 0.15-0.3 mg/cm$^2$) to balance the mass loading and contact resistance.

A. Synthesis of the MnO$_2$ Thin Films

Inorganic MnO$_2$ nanosheets are prepared using modifications to the method disclosed in Qian et al. Angew. Chem. Int. Ed., 54(23):6800-6803 (2015) and U.S. patent application Ser. No. 15/449,715.

10-15 wt % glucose solution is poured into the Teflon-sealed stainless autoclave (e.g. Parr 4748 acid digestion bomb) at 160-200° C., and preferably 170-190° C., and most preferably at 180-185° C. for at least 160 minutes, and preferably 170-200 minutes, and most preferably at 180-190 minutes.

When the reaction is completed, the suspension is poured out for filtration. The residues are collected and re-dissolved into water and sonicated sufficiently to form a 0.1 mg·mL$^{-1}$ suspension. Then 16 mg·mL$^{-1}$ KMnO$_4$ solution is then added into the suspension dropwise under continuous stirring and maintained at 30-60° C., and preferably 35-55° C., and most preferably at 40-45° C. for at least 6 hours, and preferably within 6-10 hours, more preferably within 6-8 hours, and most preferably within 6-7 hours. The mass ratio of KMnO$_4$ and carbon was about 8:1. After that, the suspension is poured into the Teflon-sealed stainless steel autoclave at 100-150° C. and preferably 100-130° C., and most preferably at 100-120° C. for at least 3 hours, and preferably within 3-6 hours, more preferably within 3-5 hours, and most preferably within 4-5 hours. The reaction should proceed as follows:

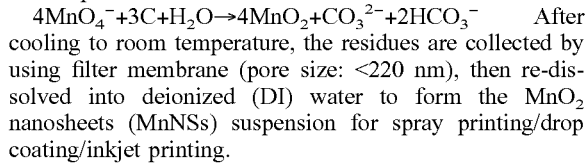

After cooling to room temperature, the residues are collected by using filter membrane (pore size: <220 nm), then re-dissolved into deionized (DI) water to form the MnO$_2$ nanosheets (MnNSs) suspension for spray printing/drop coating/inkjet printing.

Figure 3:
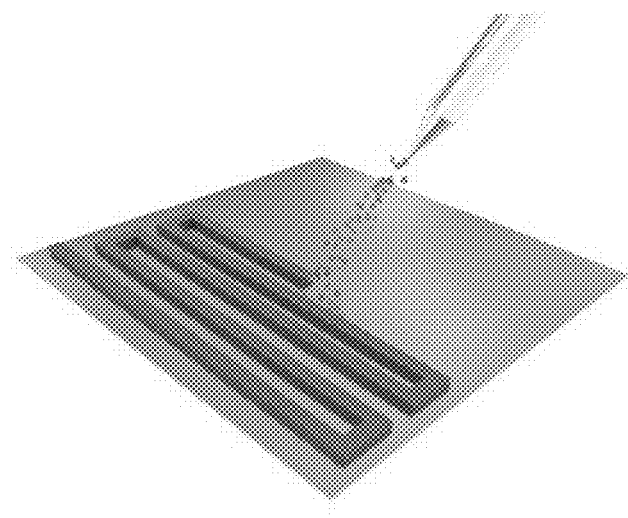
FIG. 3 shows a schematic diagram of the spray coating process.

Typically, the substrate may be pre-treated by washing by ethanol, acetic acid and DI water for several times. The MnNSs suspension is drop coated onto the substrate, although it would be appreciated that, spray-printing or inkjet printing could also be utilised to apply the nanosheets (MnNSs) suspension on the substrate at 32-45° C. and preferably 34-42° C., and most preferably at 35-40° C. to form a conformal layer without any additives, such as that schematically depicted in FIG. 3. If coating is performed by printing, the printing speed could be adjusted appropriate by the user. A typical printing speed is between 80 and 200 cm·minute$^{-1}$. The mass loading could be adjusted by repeatedly printing.

For MnO$_2$ electrode on temperature-sensitive substrates, such as copper foam, copper foil and graphene foam, the MnO$_2$ thin films are generally annealed at 260-320° C. and preferably 275-310° C., and most preferably at 290-300° C. in vacuum for at least 100 minutes and preferably 110-130 minutes, and most preferably at 115-125 minutes. In an embodiment, 300° C. is utilized for temperature sensitive substrates, such as copper, together with a protection gas (such as Nitrogen) which function to protect the substrate against oxidation at such temperatures.

For MnO$_2$ electrode on temperature-stable substrates including stainless steel, carbon fiber cloth (carbon fabrics), the substrate is usually pre-treated, e.g. by washing using ethanol, and DI water for several times. The same spray printing process is employed. It would be appreciated by persons skilled in the art, stainless steel or other temperature-stable substrates could be annealed in air without a protective gas such as N2.

After drying, the $MnO_2$ thin films is annealed at the same temperature for the same duration time in air. For those polymer substrates that cannot heated even above 150° C., such as ITO/PET, the $MnO_2$ thin films should be heated at 80-110° C., preferably 90-100° C. in air.

The surface may be optionally coated with other conductive materials, such as gold, to increase conductivity. Alternatively, other conductive materials with chemical inertness could also be added, such as graphene.

B. Assembly of Half Cell

Assembly of half cells are described with reference to Li-ion and Na-ion batteries, however, it would be appreciated by persons skilled in the art that other batteries may be formed using similar methods.

Half cells (e.g. CR2032 coin cell) can be assembled in an argon-filled Mbraun glovebox (with both $H_2O$ and $O_2$ contents less than 0.1 ppm).

For Li-ion batteries, Li foil served as the counter electrode.

A number of different electrolytes may be utilised including:
- 1.0 mol·$L^{-1}$ $LiPF_6$ was dissolved in ethylene carbonate (EC) and dimethyl carbonate (DMC) (EC:DMC, 1:1 vol %)
- 1.0 mol·$L^{-1}$ $LiPF_6$ was dissolved in EC and diethyl carbonate (DEC) (EC:DEC, 1:1 vol %)
- 0.5 mol·$L^{-1}$ $LiCF_3SO_3$ and 0.5 mol·$L^{-1}$ $LiNO_3$ dissolved in diethyleneglycol dimethylether (DEGDME).

For Na-ion batteries, Na foil served as the counter electrode. The electrolytes may include:
- 1.0 mol·$L^{-1}$ $NaClO_4$ was dissolved in propylene carbonate (PC) with addition of 5% fluoroethylene carbonate (FEC)
- 1.0 mol·$L^{-1}$ $NaCF_3SO_3$ dissolved in DEGDME
- 1.0 mol·$L^{-1}$ $NaCF_3SO_3$ dissolved in EC/DEC (EC:DEC, 1:1 vol %)
- 1.0 mol·$L^{-1}$ $NaCF_3SO_3$ dissolved in PC.

The $MnO_2$ thin films are cut into small circles and regarded as the electrode materials for the batteries. Batteries with $MnO_2$ thin films as electrode are subjected to battery tests to determine their electrochemical performances as detailed in the Example section.

C. Advantages

As compared with known methods of protection of $MnO_2$ electrodes, the method described herein allows scalable production of $MnO_2$ electrodes and $MnO_2$ electrode based battery, in a more cost effective and efficient manner, without the need of expensive materials and instruments.

The synthesis process of the $MnO_2$ electrodes is not only faster and simpler than the existing technology (due to the possibility of mass printing), the method provides increased versatility as the electrode could be printed on a variety of substrates with arbitrary shapes.

According to the test results, the $MnO_2$ thin films are shown to be highly stable, and displayed exceptional resistance to a number of common used solvents (such as, ethanol, acetone, IPA, water). Further, the $MnO_2$ thin films can be directly used as electrodes for batteries, such as rechargeable Li-ion and Na-ion batteries, without any additives. Such features are highly desirable in the industry due to: ease in storage, large scale production, absence of contaminations which may occur when additives are used.

It is expected that, due to the exceptionally small size of the present $MnO_2$ nanosheets, the nanosheets are able to give a strong finite-size effect (J. Xu et al, Science 355, 59-64 (2017)), resulting in a homogeneous and robust thin film on different substrates even in the absence of additives, further reducing the SEI and charge transfer resistance between the $MnO_2$ and the electrolyte according to the RSEI and Rct values in Table 3. Surprisingly, the $MnO_2$ electrode based batteries show significant improvement in electrochemical performances, demonstrating enhanced cyclic performance and long term stability to compared to existing $MnO_2$-based composite materials. Specifically, the test results show a discharge capacity of 696 mAh·$g^{-1}$ and 148 mAh·$g^{-1}$ after 100 cycles at 0.25 A·$g^{-1}$ with 59% and 80% capacity retentions at a high current density of 1 A·$g^{-1}$ for Li-ion and Na-ion batteries prepared using the $MnO_2$ electrodes of the invention.

It would be appreciated by persons skilled in the art that the presently disclosed $MnO_2$ electrodes is suitable in a variety of batteries, not limited to Li-ion batteries, Na-ion batteries, rechargeable zinc batteries. The present invention can further be used as an energy source for active radio frequency identification (RFID) system, or devices such as a portable device, or those that need to be flexible in shape. Additionally, the $MnO_2$ electrodes may optionally be integrated with photovoltaic devices.

EXAMPLES

The invention will be further illustrated by the following illustrative exemplary embodiments.

Example 1: Preparation of a $MnO_2$ Electrode on Copper Foil and Stainless Steel 10 wt % glucose solution was poured into the Teflon-sealed stainless autoclave (e.g. Parr 4748 acid digestion bomb to achieve a scalable production) at 180° C. for 180 minutes. When the reaction was completed, the suspension was poured out for filtration. The residues were collected and re-dissolved into water and sonicated sufficiently to form a 0.1 mg·$mL^{-1}$ suspension. Then 16 mg·$mL^{-1}$ $KMnO_4$ solution was added into the suspension dropwise under continuous stirring and maintained at 40° C. for 6 hours. The mass ratio of $KMnO_4$ and carbon was about 8:1. After that the suspension was sealed inside stainless steel autoclave at 100° C. for 4 hours. After cooling to room temperature, the suspension was filtered by using filter membrane (pore size: <220 nm), then re-dissolved into deionized (DI) water to form the $MnO_2$ nanosheets (MnNSs) suspension for spray printing. All chemicals employed were analytical reagents purchased from International Laboratory, USA and were used without further purification.

Figure 4A:
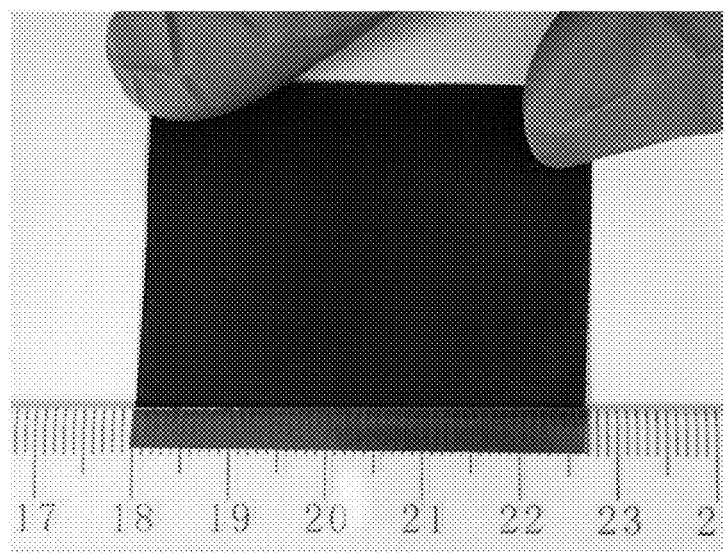
FIG. 4A shows an optical photograph of the MnO₂ thin films on copper foil (Cu—MnTFs).

To fabricate the $MnO_2$ thin films on copper foil, MnNSs suspension was poured into the cartridge of the home made spray printing system. Copper foil was thoroughly washed by ethanol, acetic acid and DI water for several times. The MnNSs suspension was spray-printed on the copper foil at 35° C. to form a conformal layer without any additives. The printing speed adopted was 80 cm/minute. The mass loading was adjusted by repeatedly printing. After drying, the $MnO_2$ thin films were annealed at 300° C. in vacuum for 120 minutes. A schematic depiction of the $MnO_2$ electrode printed on copper foil is provided in FIG. 3. After annealing at 300° C. for 2 h in vacuum, a conformal $MnO_2$ thin film with bright brown color and no obvious film cracking or agglomeration is observed, as shown in FIG. 4A.

To fabricate the $MnO_2$ thin films on stainless steel (SS) sheet, MnNSs suspension was poured into the cartridge of the home made spray printing system. SS sheet was thoroughly washed by ethanol and DI water for several times.

Figure 7A:
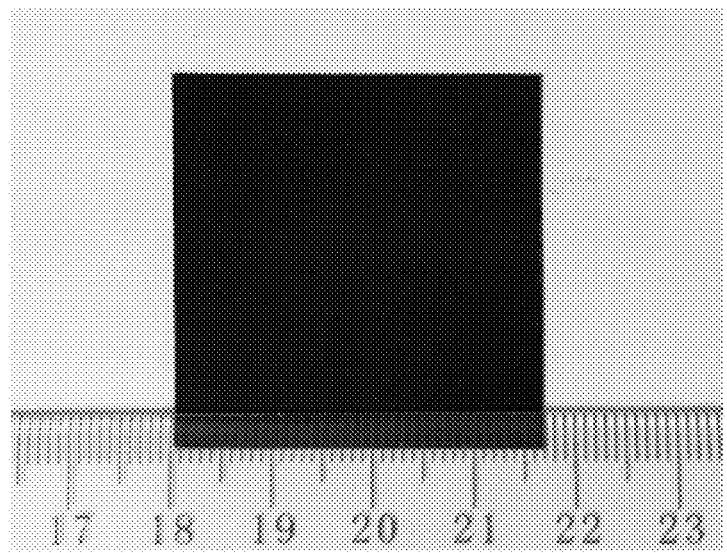
FIG. 7A shows the optical photograph of the MnO₂ thin films on stainless steel sheet (SS-MnTFs).

The MnNSs suspension was spray-printed on the SS sheet at 55° C. to form a conformal layer without any additives. The printing speed adopted was 140 cm/minute. The mass loading was adjusted by repeatedly printing. After drying, the $MnO_2$ thin films were annealed at 300° C. in air for 120 minutes. The conformal $MnO_2$ thin films on SS sheet (SS-MnTFs) with dark colour are shown in FIG. 7A.

Example 2: Characterization of $MnO_2$ Electrode on Copper Foil and Stainless Steel Material characterizations are conducted using methods commonly known to a person skilled in the art and as described below.

The surface and cross sectional morphology and the energy-dispersive X-ray spectroscopy (EDX) of the $MnO_2$ thin films were characterized by scanning electron microscopy (SEM) (Tescan MIMA3). TEM images and select area electron diffraction (SAED) pattern were recorded through a JEM 2100F (field emission) scanning transmission electron microscope (spherical aberration Cs: 2.3 mm, Chromatic aberration Cc: 1.0 mm, point resolution 0.23 nm) equipped with an Oxford INCA x-sight EDS Si(Li) detector. XRD pattern was carried out by using a Rigaku SmartLab X-ray diffractometer operating at 45 kV and 200 mA with Cu Kα source ($\lambda$=1.54056 Å). Raman spectrum was recorded by using a micro laser Raman spectrometer (DX2, Thermo, $\lambda$=532 nm). Atomic force microscopy (AFM) image was recorded by using Digital Instrumental Nanoscope IV in tapping mode. N2 adsorption and desorption analysis were measured at −196° C. by using Micromeritics ASAP 2020.

Results

Figure 1B:
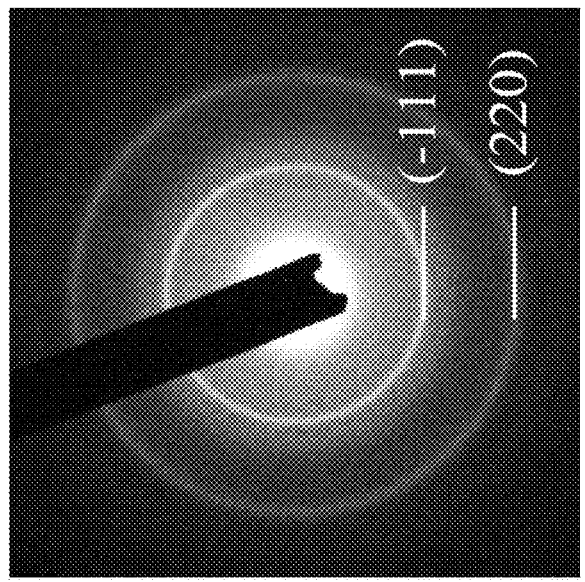
Figure 2:
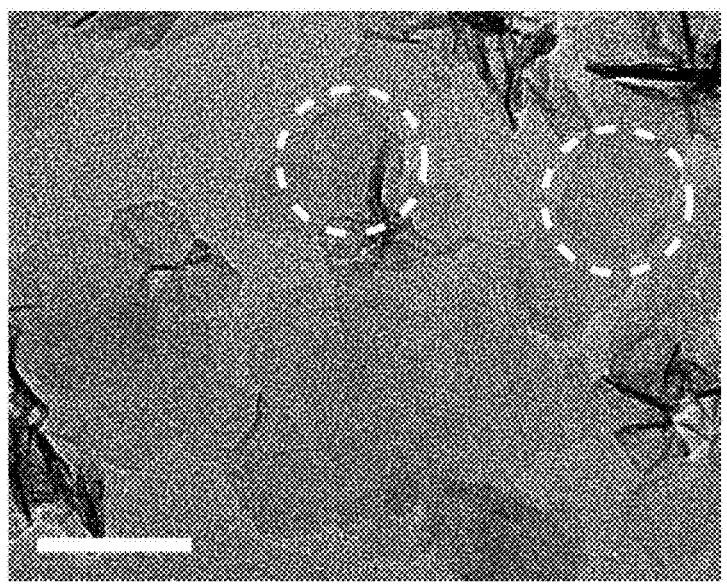
FIG. 2 shows the zoom-in TEM image of the MnO₂ nanosheets. Scale bar is 50 nm. The MnO₂ nanosheets are highlighted by white dashed lines.

As shown in the TEM images of the $MnO_2$ nanosheets (FIGS. 1A, 1B and 2), the average size of the $MnO_2$ nanosheets is <50 nm in diameter. With reference to JCPDS card 80-1098, the Selected Area Diffraction (SAED) pattern of FIG. 1B shows two characteristic diffraction rings at d-spacings of ~2.408, and 1.245 Å respectively, which could be attributed to the (−111) and (220) reflections of the $MnO_2$ nanosheets.

Figure 4B:
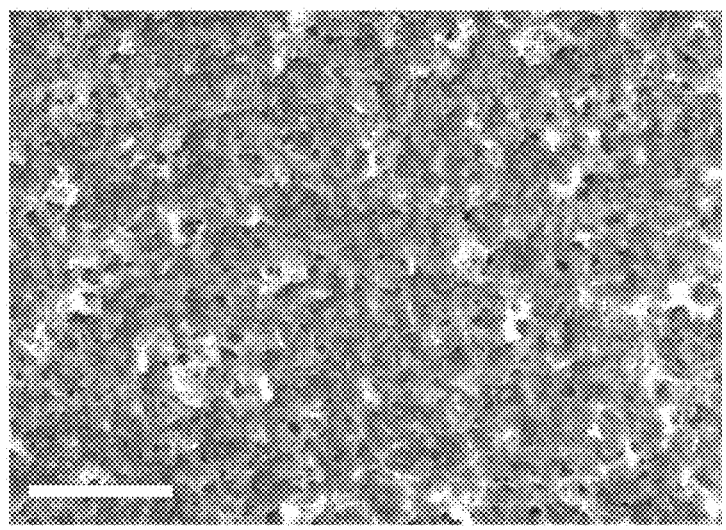
FIG. 4B shows the surface view of SEM image of the Cu—MnTFs. Scale bar is 1 μm.
Figure 4C:
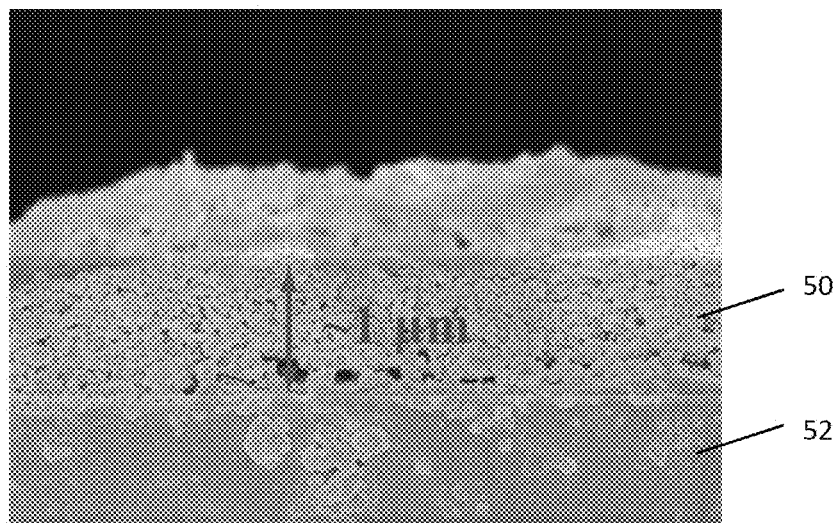
FIG. 4C shows the cross-sectional view of SEM image of the Cu-MnTFs.
Figure 4D:
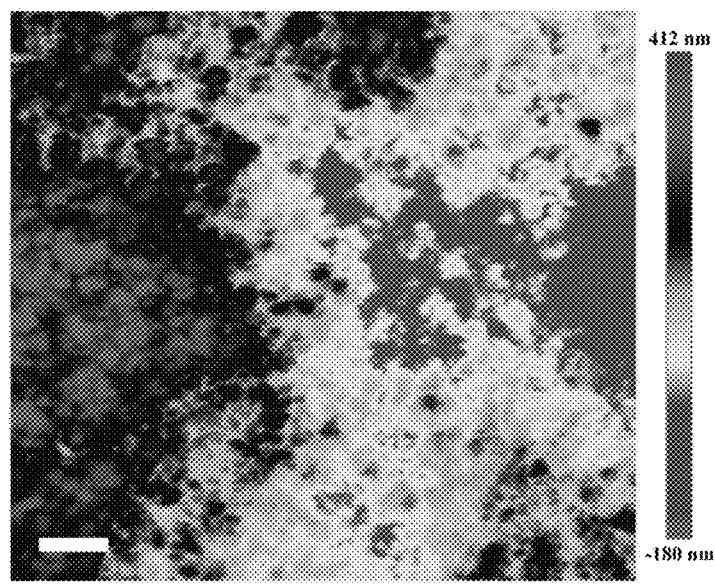
FIG. 4D shows the AFM image of the Cu—MnTFs.

The physical characteristics of the $MnO_2$ thin films on the copper foil (Cu—MnTFs) are examined. The surface and cross sectional view of scanning electron microscopy (SEM) images of the Cu—MnTFs are shown in FIGS. 4B and 4C with a $MnO_2$ layer 50 on Cu foil 52. It could be seen clearly that pores and tunnels were formed by the stacking of $MnO_2$ nanosheets. The cross sectional SEM image of the Cu—MnTFs also shows a porous structure. The diameter of the pores and tunnels could be estimated ranging from ~10 to ~100 nm. The thickness of the $MnO_2$ layer is estimated to be ~1 μm. The porous structure could facilitate the Li or Na ions transportation on the interface between the electrode and electrolyte. Not only rectangular or square shapes, the patterned Cu—MnTFs could also be achieved by the pre-designed programming. The AFM image of the Cu—MnTFs shows a porous surface in FIG. 4D.

Figure 5:
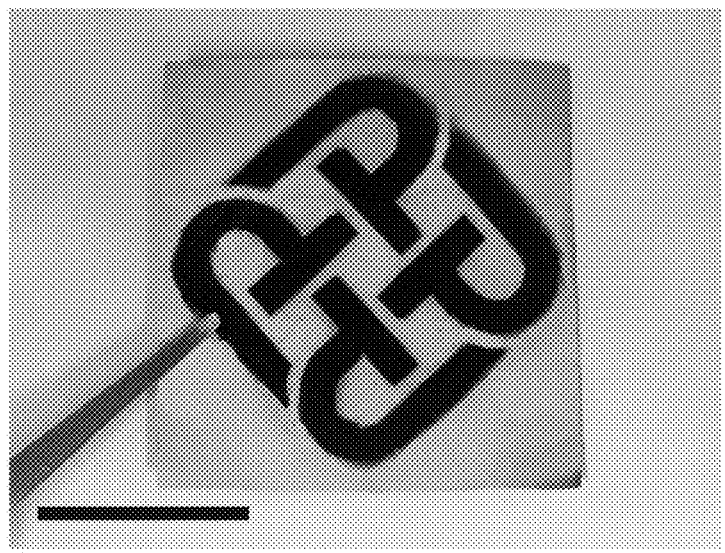
FIG. 5 shows the optical photograph of the MnO₂ electrode patterned by a "PolyU" logo. Scale bar: 2 cm.

As shown in FIG. 5, the "PolyU" logo is spray printed on the copper foil, indicating a potential in flexible and versatile-shaped power sources would be feasible.

Figure 6A:
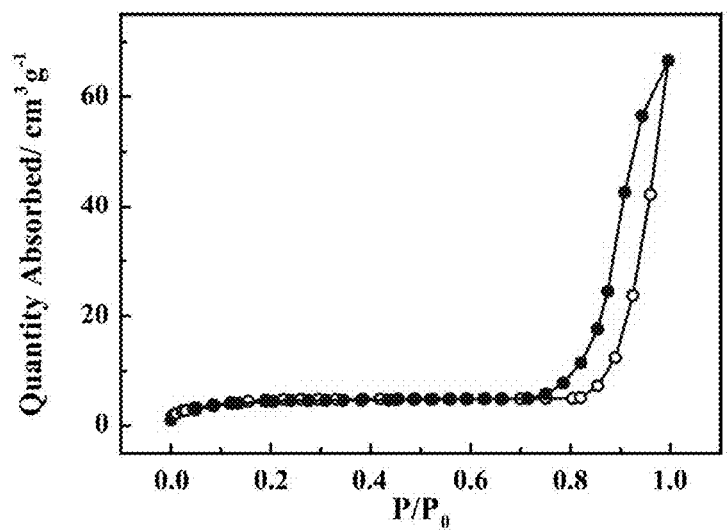
FIG. 6A shows the N₂ adsorption/desorption isothermal of the Cu—MnTFs.
Figure 6B:
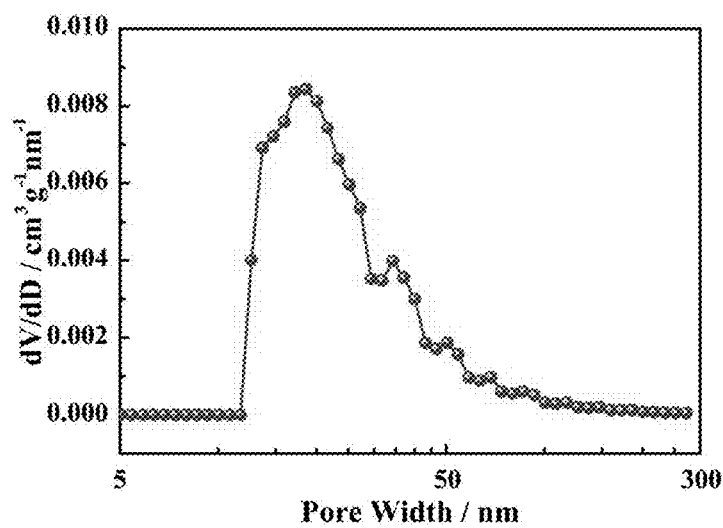
FIG. 6B shows the pore size distribution analysis of the Cu—MnTFs.

$N_2$ adsorption/desorption isothermal and pore size distribution analysis of the Cu—MnTFs are performed with their results shown in FIGS. 6A and 6B. The result of Brunauer-Emmett-Teller (BET) surface area analysis shows that the specific surface area and total pore volume of the Cu—MnTFs are approximately 15.4 $m^2 \cdot g^{-1}$ and 0.1 $cm^3 \cdot g^{-1}$ respectively (calculated from FIG. 6A; considering only the weight of $MnO_2$ thin films), which could be contributed mainly by mesopores with the mean average pore size of ~27 nm. As shown in FIG. 6B, the $MnO_2$ thin films show a broad peak ranging from ~6.5 to 80 nm, including mesopores (>10 nm) and macropores, and the results are consist with the SEM images. The porous structure is expected to be able to facilitate Li or Na ions transportation on the interface between the electrode and electrolyte, when used for Li or Na-ion batteries.

Figure 7B:
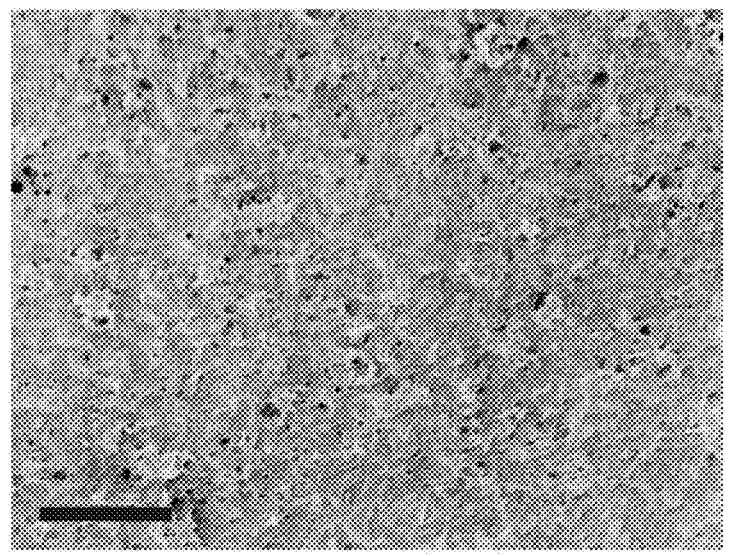
FIG. 7B shows the surface view of SEM image of the SS-MnTFs. Scale bar is 1 μm.
Figure 7C:
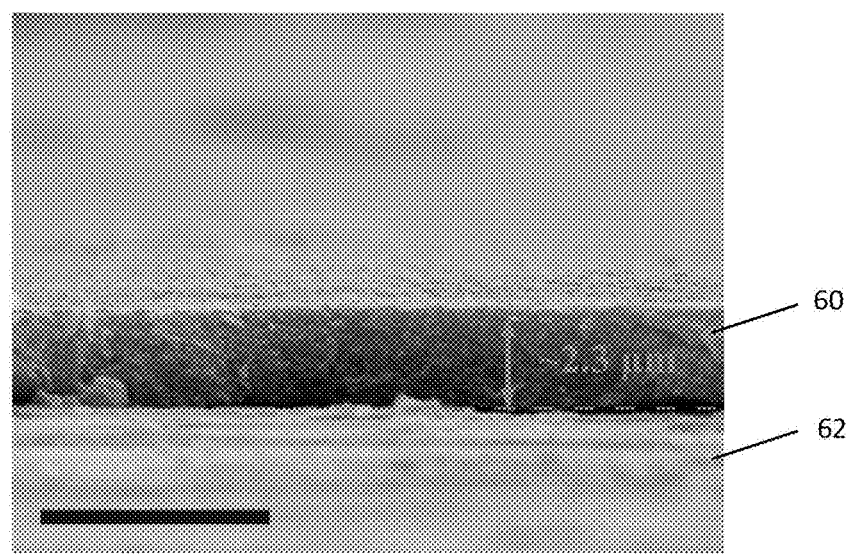
FIG. 7C shows the cross-sectional view of SEM image of the SS-MnTFs. Scale bar is 5 μm.
Figure 7D:
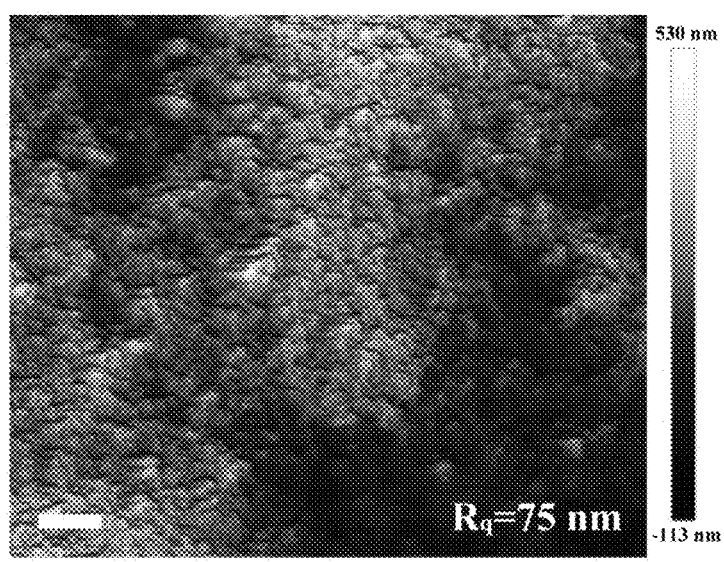
FIG. 7D shows the AFM image of the SS-MnTFs.

The physical characteristics of the $MnO_2$ thin films on the stainless steel sheet (SS-MnTFs) are also examined. The surface and cross sectional view of SEM images of the SS-MnTFs are shown in FIGS. 7A and 7B. Similar to the Cu—MnTFs, the surface SEM image of SS-MnTFs shows pores and tunnels were formed by the stacking of MnNSs in FIG. 7C, with $MnO_2$ layer 60 on Stainless steel 62. The cross-sectional SEM image of the SS-MnTFs also shows a homogeneous layer with an estimated thickness of up to ~2.3 μm. The height profile of the SS-MnTFs exhibits a porous surface with a roughness ($R_q$) of 75 nm, which agrees with the results of the SEM images, as shown in FIG. 7D.

Figure 8:
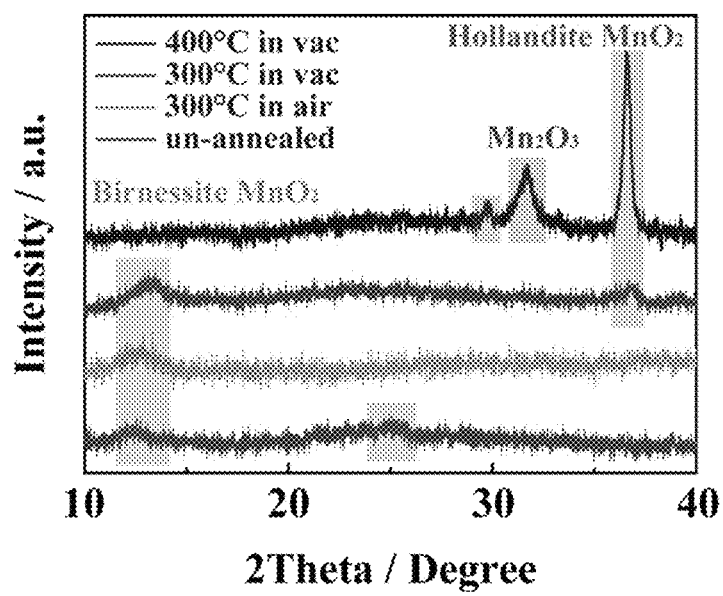
FIG. 8 exhibits the XRD patterns of different MnTFs.
Figure 9:
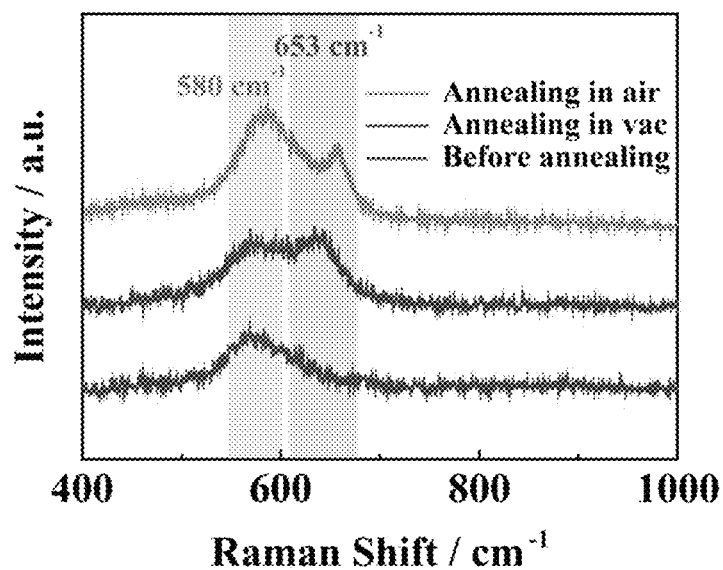
FIG. 9 exhibits the Raman spectra of different MnTFs.

The as-prepared MnTFs are characterized by X-ray diffraction (XRD) and Raman spectroscopy as shown in FIGS. 8 and 9. The XRD patterns of the MnTFs prepared under different conditions (un-annealed, annealed at 300° C. in vacuum and air and 400° C. in vacuum) are shown in FIG. 8. The XRD pattern of un-annealed MnTFs exhibits two peaks at 12.5° and 25°, which could be assigned to the birnessite $MnO_2$ (JCPDS No. 80-1098). When annealing at 300° C. in air or vacuum, the peak at 12.5° could still be observed, while another small peak at 36° corresponding to the formation of hollandite $MnO_2$ (JCPDS No. 44-0141) appears in the result of MnTFs annealing in vacuum. If the annealing temperature continues rising to 400° C., the peaks belonged to birnessite $MnO_2$ both disappeared. Simultaneously, the intensity of hollandite $MnO_2$ peak becomes much higher and another peak belonged to $Mn_2O_3$ (JCPDS No. 41-1442) appears at 31°. Besides, the Raman spectrum of the MnTFs before and after annealing shows two peaks located at 570 and 650 $cm^{-1}$, which could be both attributed to the Mn—O lattice vibrations, further confirming the yield of $MnO_2$ layer on the substrate.

The physical property of Cu—MnTFs was further examined by comparing the robustness with a conventional $MnO_2$ thin films on copper foil. The conventional $MnO_2$ thin films was prepared by a traditional, known method, in which commercial available $MnO_2$ powder was mixed with carbon black and carboxymethyl cellulose (CMC) in a mass ratio of 7:2:1. The mixture was grinded for 30 minutes and dissolved into DI water to form slurry. Then the slurry was coated on a copper foil and drying at 60° C. for 1 hours.

FIGS. 10A and 10B shows the optical photographs of the conventional $MnO_2$ thin films before and after washing (by using DI water, ethanol and acetone) and rubbing. It is apparent that the active materials were peeled-off after washing and rubbing. In contrast, the Cu—MnTFs remained almost the same before and after washing and rubbing, as shown in FIGS. 11A and 11B respectively.

Figure 12A:
FIG. 12A exhibits the film adhesion test of conventional MnO₂ thin films by using Scotch tape.
Figure 12B:
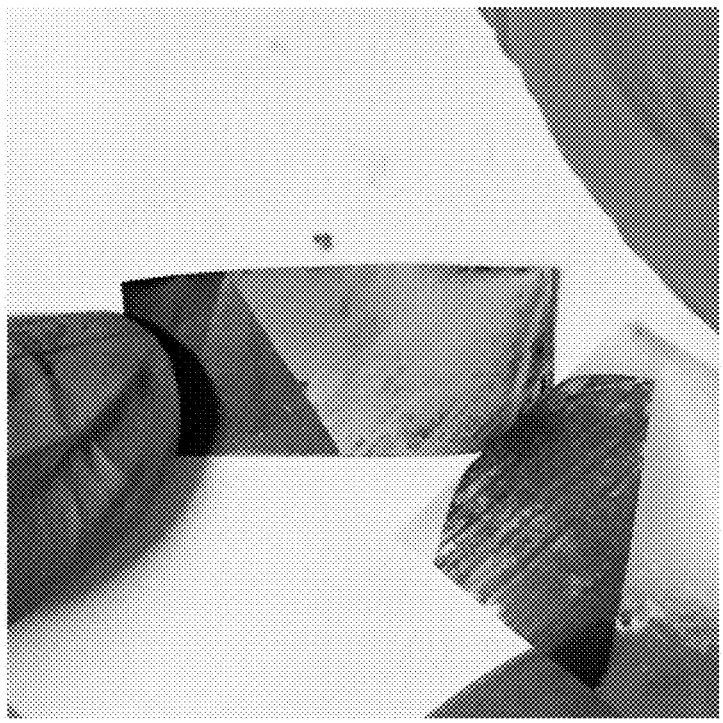
FIG. 12B exhibits the film adhesion test of Cu—MnTFs by using Scotch tape.

The conventional $MnO_2$ thin films and Cu—MnTFs were also both tested by using Scotch tapes, as shown in FIGS. 12A and 12B. The results show both $MnO_2$ layers were peeled-off. Compared to the conventional $MnO_2$ thin films, the Cu—MnTFs still shows a continuous thin film on the Scotch tape as seen in FIG. 12B.

Example 3: Preparation of Comparative MnO$_2$-Based Electrodes and Comparison with Presently Described Embodiments of the Invention ("CE" Represents Comparative Experimental Example)

Preparation of the MnO$_2$/Nitrogen-Doped Graphene Hybrid Aerogel Composite ("CE-A")

The MnO$_2$/nitrogen-doped graphene hybrid aerogel composites (MNGAs) were fabricated through a facile redox reaction between KMnO$_4$ and carbon within NGHs. In a typical procedure, NGHs were immersed in a solution of 0.1 M KMnO$_4$/0.1 M Na$_2$SO$_4$ for 120 minutes. The above mixture was vigorously shaken in a shaker at room temperature to promote the diffusion of KMnO$_4$/Na$_2$SO$_4$ solution into NGHs and the spontaneous reaction between KMnO$_4$ and carbon in NGHs. After the reaction, the hybrid hydrogels were dialyzed with a great amount of deionized water for 48 h. The final products, MNGAs, were obtained by freeze drying the hybrid hydrogels for 24 h under vacuum.

Preparation of the 3D Porous Graphene/MnO$_2$ Composite ("CE-B")

The pretreated macroporous acrylic type cation-exchange resin was firstly impregnated with 0.05 mol/L of nickel acetate solution (100 mL). The nickel ion exchanged resin was washed and dried. Then, the nickel ion exchanged resin (10 g) was added into 400 mL KOH-ethanol solution containing 20 g KOH under stirring and dried to form a nickel ion exchanged resin-KOH mixture. Finally, the mixture was heated at 850° C. for 2 h in a N$_2$ atmosphere with a heating rate of 2° C./minute. After cooling down to room temperature, the resulting sample was treated with 3 mol/L HCl solution to remove nickel nanoparticles and other impurities. The sample was finally washed and dried. The 3D PG powders were vacuum dried at 120° C. for about 5 h. The 3D PG-1.5Mn composites were prepared using a self-controlled redox deposition process as follows: 3D PG powders (80 mg) were added into 2.4 L KMnO$_4$ aqueous solutions with 1.5 mmol/L KMnO$_4$) and stirred in an ambient atmosphere at room temperature for 1 h, respectively. After the reaction, the samples were filtered, washed repeatedly with deionized water, and dried in air at about 80° C. for 24 h.

Preparation of the MnO$_2$/Hollow Carbon Spheres Composite ("CE-C")

Synthesis of Hollow Carbon Sphere (HCS):

The hollow carbon sphere (HCS) was obtained by templating against hard particles. Typically, 5.5 g resorcinol (R) and 9.5 ml formaldehyde (F) were dissolved in 30 mL water. The amount of PMMA emulsion was added into the solution. After hermetic in the 85° C. oven for 72 h, the precursor was sintered at 800° C. for 1 h under nitrogen atmosphere to get HCS. The PMMA template was prepared by emulsifier-free emulsion polymerization of methyl methacrylate monomer (MMA) at 76° C. with potassium persulfate (KPS) as an initiator.

Synthesis of MnO$_2$/HCS Composites:

MnO$_2$/HCS composites were prepared by a facile redox method. Typically, 30 mg of HCS and 100 mg of P123 were dispersed in 30 mL water. After stirring for 3 h, 79 mg of KMnO$_4$ were added into the solution, respectively. The solutions were incubated at 80° C. with continuous magnetic stirring for 3 h in a water bath, then filtrated and rinsed to get the final products.

Preparation of the MnO$_2$/N-Doped Graphene Composite ("CE-D")

Synthesis of the N-Doped Graphene:

Graphene oxide (GO) was synthesized using modified Hummer's method. The PPy/GO was prepared by the addition of 2.5 ml H$_2$O$_2$ to the GO/pyrrole/FeCl$_2$/H$_2$O (100 mg/0.5 ml/0.05 g/100 ml) mixture and allowed to stand for 6 hours. Then, the PPy/GO was annealed in a quartz tube under the protection of the N$_2$ atmosphere (150 sccm) at a heating rate of 10° C./minute to a carbonization temperature (500° C., 700° C., 900° C., and 1100° C. each for 2 h) to prepare N-doped graphene nanosheets.

Synthesis of the MnO$_2$/NG Composite:

The MnO$_2$/NG composite was prepared by the hydrothermal synthesis method. The reaction solution was obtained by mixing 11 mg KMnO$_4$ and 8 mg N-doped graphene nanosheets in 10 ml of deionized water under adequate stirring and then transferred into a Teflon-lined stainless steel autoclave. The autoclave was maintained at 220° C. for 24 h, and then cooled down to room temperature.

The Preparation of Graphene Nanoribbons (GNRs) (CE-E):

A sample of multi-walled carbon nanotubes (MWCNTS, 100 mg, 8.3 mmol) was added to an oven-dried 250 mL round-bottom flask containing a magnetic stir bar. The vessel was then transferred to a N2 glovebox where freshly distilled 1,2-dimethoxyethane (35 mL) and liquid Na/K alloy (0.29 mL) were added. The flask containing the suspension was then sealed with a septum and transferred out of the glovebox where the suspension was dispersed by a short 5 min ultra-sonication (using ultrasonic cleaner Cole-Parmer model 08849-00) to yield a dark greenish to red suspension. After ultra-sonication, the reaction mixture was vigorously stirred (450 rpm) at room temperature for 3 days. The reaction suspension was then quenched by the addition of the 1-iodoalkane (8.75 mmol) through a syringe and left to stir at room temperature for an additional day. Methanol (20 mL, 500 mmol) was then added to quench any excess Na/K alloy, and the mixture was stirred at room temperature for 10 min. For workup, the reaction mixture was filtered over a 0.45 μm pore size PTFE membrane. The filter cake was successively washed with THF (100 mL), i-PrOH (100 mL), H2O (100 mL), i-PrOH (100 mL), THF (100 mL) and Et$_2$O (10 mL). Then Soxhlet extraction with THF was used for 3 days, and the product was dried in vacuum (~10$^{-2}$ mbar) for 24 h.

The Preparation of Graphene/MnO$_2$/GNRs (GMG):

The GNRs were then oxidized in 3 mol/L HNO$_3$ at reflux for 12 h in order to increase their wettability. MnO$_2$-GNRs were prepared by direct redox reaction of KMnO$_4$ on the HNO$_3$-treated GNRs. In a typical procedure, 20 mg GNRs was added to 40 mL in-house deionized water (DI water) and the mixture was ultra-sonicated (2510 Branson ultra-sonicator) to disperse the GNRs. 63 mg KMnO$_4$ was added to the dispersion and the dispersion was magnetically stirred for 3 h at room temperature. The dispersion was transferred to a Teflon-lined autoclave. After sealing, the autoclave was kept in the oven at 180° C. for 5 h to carry out the hydrothermal reaction, and then it was removed from the oven and cooled to room temperature. MnO$_2$-GNRs (51 mg) were obtained after vacuum filtration and washing sequentially with water (400 mL) and acetone (100 mL); the filter cake was dried in a vacuum oven at 85° C. for 10 h. Graphene-wrapped MnO$_2$-GNRs (GMG) was synthesized in two steps. The first step was to positively charge MnO$_2$-GNR by coating it with aqueous polydiallyldimethylammonium chloride (PDDA). 40 mg of MnO$_2$-GNR was dispersed in 40 mL DI water containing 0.4 mL of PDDA. After 5 h stirring at room temperature, positively charged PDDA-MnO$_2$-GNRs (40 mg) was obtained via vacuum filtration and washing the solid with DI water (400 mL) and ethanol (100 mL), and drying it in a vacuum oven at 85° C. for 10 h. Then, 30 mg PDDA-MnO$_2$-GNRs was dispersed in 40 mL DI water by ultrasonic treatment, and the solution was adjusted to pH using 1 mol/L ammonia in ethanol. The PDDA-MnO$_2$-GNRs suspension was added to a negatively charged graphene solution that was prepared by the reported method and the mixture was stirred for 2 h. GMG (32 mg) was obtained after vacuum filtration followed by washing sequentially with DI water (400 mL) and ethanol (100 mL), followed by drying in a vacuum oven at 85° C. for 10 h.
Preparation of the MnO$_2$ Nanoflowers ("CE-F")

For the synthesis of MnO$_2$ nanoflowers, 0.5 g KMnO$_4$ and 0.2 g MnSO$_4$.H$_2$O were nixed in 45 mL distilled water and then stirred with a magnetic stirrer to form a homogeneous aqueous solution at room temperature. Then the well-mixed solution was transferred to a Teflon-lined stainless steel autoclave. The autoclave was loaded into an electric oven and healed to 140° C. for 3 h. After the dwell time, the autoclave was cooled down to room temperature. Then, the precipitates were filtered and washed repeatedly with distilled water. Finally, the MnO$_2$ nanoflowers were obtained after annealing at 400° C. for 2 h at the heating rate of 1° C./minute in air atmosphere.
Preparation of the MnO$_2$ Nanorods ("CE-G")

For the synthesis of MnO$_2$ nanorods, 0.5 g KMnO$_4$ and 0.2 g MnSO$_4$.H$_2$O were mixed in 45 mL distilled water and then stirred with a magnetic stirrer to form a homogeneous aqueous solution at room temperature. Then the well-mixed solution was transferred to a Teflon-lined stainless steel autoclave. The autoclave was loaded into an electric oven and heated to 160° C. for 12 h. After the dwell time, the autoclave was cooled down to room temperature. Then, the precipitates were filtered and washed repeatedly with distilled water. Finally, the MnO$_2$ nanorods were obtained after annealing at 400° C. for 2 h at the heating rate of 1° C./minute in air atmosphere.

Table 1 below provides a comprehensive comparison of the production process between a-MnO$_2$ electrode (according to the present disclosure) and other MnO$_2$-based electrodes.

TABLE 1

| Ref. | Materials | Type | Substrate | Additive |
|---|---|---|---|---|
| CE-A | MnO$_2$/nitrogen-doped graphene hybrid aerogel composite | LIB | Cu foil | CB + PVDF |
| CE-B | 3D porous graphene/MnO$_2$ composite | LIB | Cu foil | PVDF |
| CE-C | MnO$_2$/hollow carbon spheres composite | LIB | Cu foil | CB + n-lauryl acrylate |
| CE-D | MnO$_2$/N-doped graphene composite | LIB | Ti foil | CB + PTFE |
| CE-E | graphene/MnO$_2$/graphene nanoribbons | LIB | Cu foil | CB + PVDF |
| Embodiment described herein | Cu/SSL—MnO$_2$ electrode | LIB | stainless steel sheet, Cu foil | Free |
| CE-F | MnO$_2$ nanorods | SIB | Cu foil | CB + Nalginate binder |
| CE-G | MnO$_2$ nanoflowers | SIB | Cu foil | CB + Nalginate binder |
| Embodiment described herein | Cu/SSN—MnO$_2$ electrode | SIB | stainless steel sheet, Cu foil | Free |

Note:
LIB - Lithium ion battery;
SIB - Sodium ion battery;
CB - carbon black;
PVDF - polyvinylidene difluoride;
PTFE - polytetrafluoroethylene.

Example 4

Examination of Electrochemical Performance of MnO$_2$ Electrode for Li-Ion and Na-Ion Batteries Electrode and Battery Construction Half cells (CR2032 coin cell) were assembled in an argon-filled Mbraun glovebox (with both H$_2$O and O$_2$ contents less than 0.1 ppm). For Li-ion batteries, Li foil served as the counter electrode. When the Cu—MnTFs was used as the electrode, 1.0 mol·L$^{-1}$ LiPF$_6$ dissolved in ethylene carbonate (EC) and dimethyl carbonate (DMC) (EC:DMC, 1:1 vol %) was regarded as the electrolyte. When the SS-MnTFs was used as the electrode, 1.0 mol·L$^{-1}$ LiPF$_6$ dissolved in EC and diethyl carbonate (DEC) (EC:DEC, 1:1 vol %) was regarded as the electrolyte. For Na-ion batteries, Na foil served as the counter electrode. When the Cu—MnTFs was used as the electrode, 1.0 mol·L$^{-1}$ NaClO$_4$ dissolved in propylene carbonate (PC) with addition of 5% fluoroethylene carbonate (FEC) was regarded as the electrolyte. The MnO$_2$ electrodes were cut into small circles (diameter: 14 mm) and regarded as the electrode materials for battery test.

The Cu—MnTFs and SS-MnTFs were directly used as electrodes for the Li-ion (denoted as CuL-MnO$_2$ and SSL-MnO$_2$ electrodes respectively) and Na-ion batteries electrodes (denoted as CuN—MnO$_2$ and SSN—MnO$_2$ electrodes respectively).

Electrochemical Measurements

All the electrochemical experiments were performed at ambient temperature. The galvanostatic charge/discharge (GCD) measurement was carried out on Arbin battery test system. The cyclic voltammograms (CV) and electrochemical impendence spectra were carried out on a CHI 660D electrochemical workstation (CH Instruments) for battery test. An AC stimulus (a sine wave) was applied to the electrochemical cell with amplitude of 5 mV over a frequency range from 10 mHz to 100 kHz.

Results

Figure 13A:
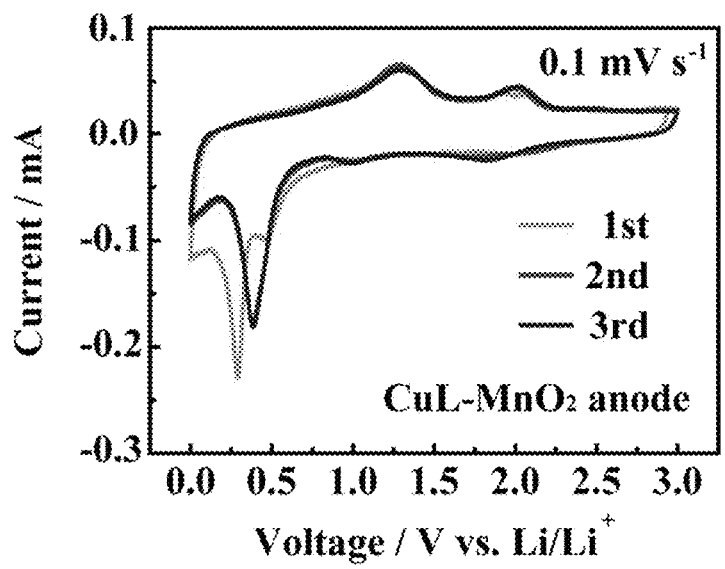
FIG. 13A depicts the CV profiles of the CuL-MnO₂ electrode at 0.1 mV·s⁻¹ between 0 and 3V.
Figure 13B:
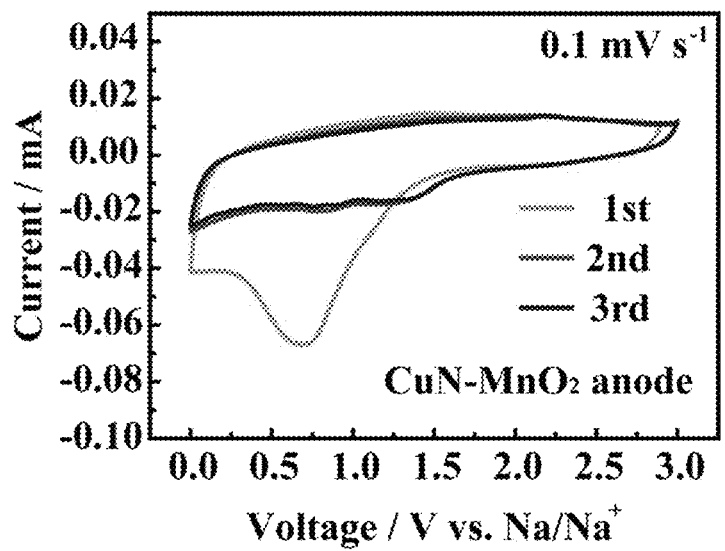
FIG. 13B depicts the CV profiles of the CuN—MnO₂ electrode at 0.1 mV·s⁻¹ between 0 and 3V.

The 1st-3rd cycles of the cyclic voltammograms (CV) curves of the CuL-$MnO_2$ electrode in a voltage range of 0-3 V at 0.1 mV·s−1 are shown in FIG. 13A. The cathodic peak appeared at 0.3V in the first negative scan process could be attributed to the reduction of $MnO_2$ and the formation of a solid electrolyte interphase (SEI) layer. From the second cycle, the peaks turn to 0.4V, indicating an irreversible structural or textural modification. Two redox peaks at 1.3 and 2.0V could be attributed to the two-step electrochemical redox reactions on electrode/electrolyte interfaces. Similarly, the first CV cycle of the CuN—$MnO_2$ electrode in a voltage range of 0-3 V at 0.1 mV·s$^{-1}$ exhibits a board peak at 0.75V due to the formation of SEI layer, as shown in FIG. 13B. Then the peak moves to ~0.9V in the second CV cycle. Besides, it is obvious that both the peaks of the CuL-$MnO_2$ and CuN—$MnO_2$ electrodes after the second CV curves are nearly unchanged, demonstrating excellent structural stability and electrochemical reversibility.

Figure 14A:
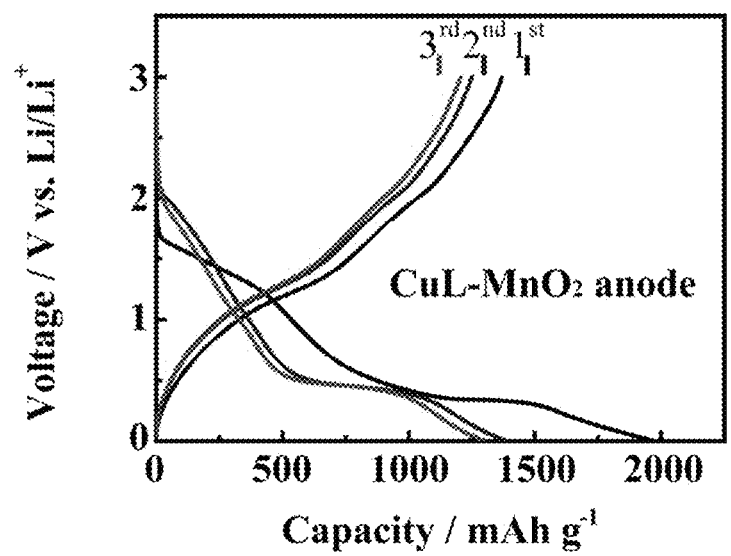
FIG. 14A shows the potential profile of the CuL-MnO₂ electrode during the 1st-3rd GCD cycles between 0 and 3 V at a current density of 0.32 A·g⁻¹.
Figure 14B:
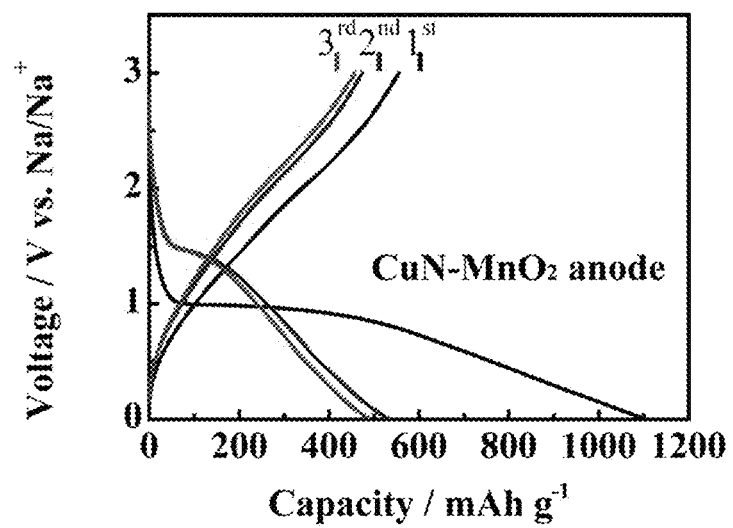
FIG. 14B shows the potential profile of the CuN—MnO₂ electrode during the 1st-3rd GCD cycles between 0 and 3 V at a current density of 0.32 A·g⁻¹.

To confirm the results of the CV curves, the galvanostatic charge/discharge (GCD) cycles at 0.32 A·g$^{-1}$ are shown in FIGS. 14A and 14B. The $1^{st}$-$3^{rd}$ GCD cycles of CuL-$MnO_2$ electrode are exhibited in FIG. 14A. A plateau appeared at ~0.35V in the first discharge process due to the irreversible reactions process, which is consistent with the results of the CV curves. The following discharge curves exhibit sharp decrease in voltage from the open-circuit potential to ~0.5V due to a very small amount of Li ions insertion. From 0.5-0.3V, a plateau appeared which is caused by the insertion process of Li ions into the CuL-$MnO_2$ electrode. The final gradual decay at 0.3-0V represents the fully insertion of Li ions into the surface of the electrode. Similarly, the first GCD cycles of CuN—$MnO_2$ electrode exhibits an obvious plateau at ~1V, then the plateau moves to ~1.5V in the following cycles, as shown in FIG. 14B.

Figure 14C:
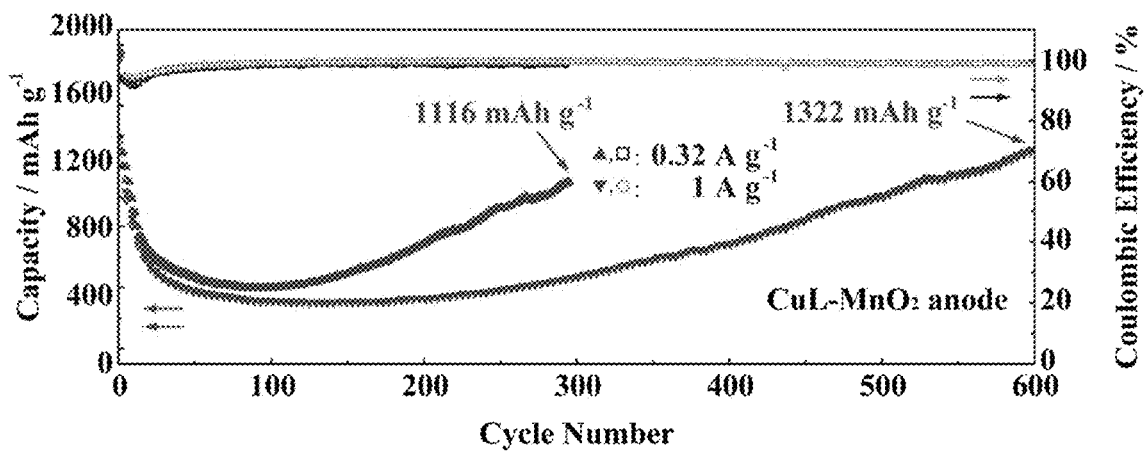
FIG. 14C shows the cyclic performance and coulombic efficiency of the CUL—MnO₂ electrode at the current densities of 0.32 and 1 A·g⁻¹ respectively.

The electrochemical properties of the $MnO_2$ electrodes on copper foil for Li-ion and Na-ion batteries (denoted as CuL-$MnO_2$ and CuN—$MnO_2$ electrodes respectively) were tested. Half cells were assembled by using the Cu—$MnO_2$ electrodes and Li/Na foils as the counter electrodes. FIG. 14C shows the cyclic performances and coulombic efficiencies of the CuL-$MnO_2$ electrode at 0.32 and 1 A·g$^{-1}$ respectively. When the current density of 0.32 A·g$^{-1}$ is applied, the initial charge and discharge specific capacity are about 1369 and 1958 mAh·g$^{-1}$. During the SEI formation process, the discharge capacity continued to reduce to ~400 mAh·g$^{-1}$, then started to recover in the following cycles. After 300 cycles, the charge and discharge specific capacities of the CuL-$MnO_2$ electrode reached 1103 and 1116 mAh·g$^{-1}$ respectively at 0.32 A·g$^{-1}$. To demonstrate the long term stability of the CuL-$MnO_2$ electrode, a 600 cycles test at a high current density of 1 A·g$^{-1}$ is also shown in FIG. 14C. A large capacity loss is observed in the first 20 cycles, then the charge and discharge capacity started to recover and finally reached 1306 and 1322 mAh·g$^{-1}$ respectively.

Figure 14D:
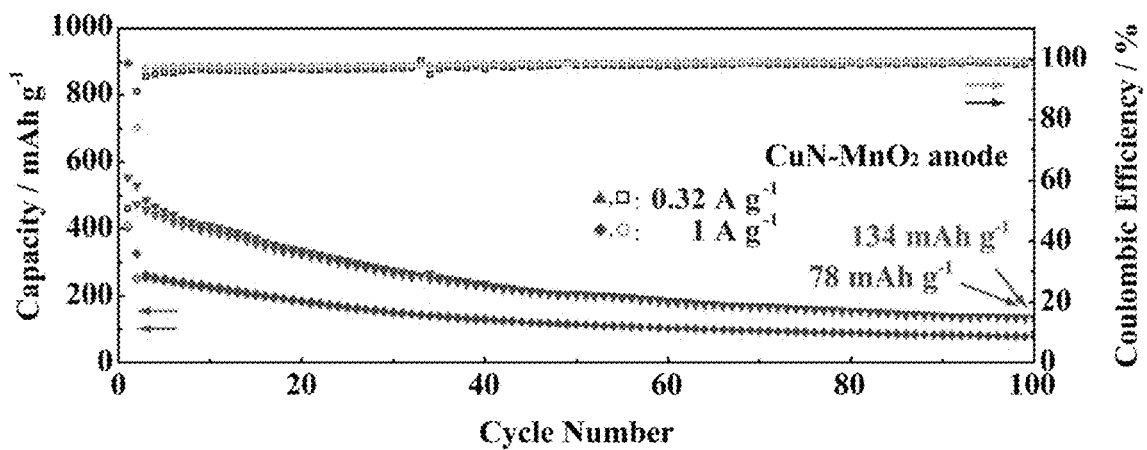
FIG. 14D shows the cyclic performance and coulombic efficiency of the CuN—MnO₂ electrode at the current densities of 0.32 and 1 A·g⁻¹ respectively.

The cyclic performances and coulombic efficiencies of the CuN—$MnO_2$ electrode at 0.32 and 1 A·g$^{-1}$ are shown in FIG. 14D. The discharge capacity could remain at 134 mAh·g$^{-1}$ and 78 mAh·g$^{-1}$ after 100 cycles at 0.32 and 1 A·g$^{-1}$ respectively. Besides, the coulombic efficiencies of the first cycle were 70% and 73% for CuL-$MnO_2$ electrodes at 0.32 and 1 A·g$^{-1}$ respectively and 51% and 45% for CuN—$MnO_2$ at 0.32 and 1 A·g$^{-1}$ respectively. After that, the coulombic efficiencies increased to nearly 100% in the following cycles, which indicates the reversibility of the Cu—$MnO_2$ electrodes.

Figure 15A:
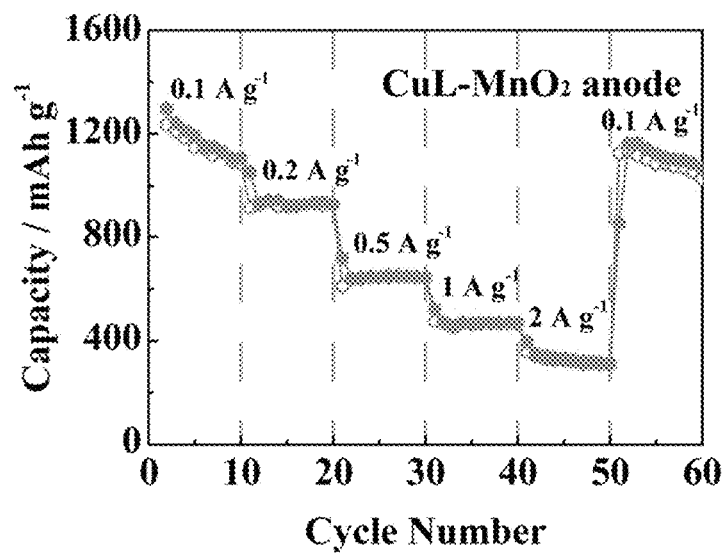
FIG. 15A shows the rate capability at different current densities of 0.1-2 A·g⁻¹ for CuL-MnO₂ electrode.
Figure 15B:
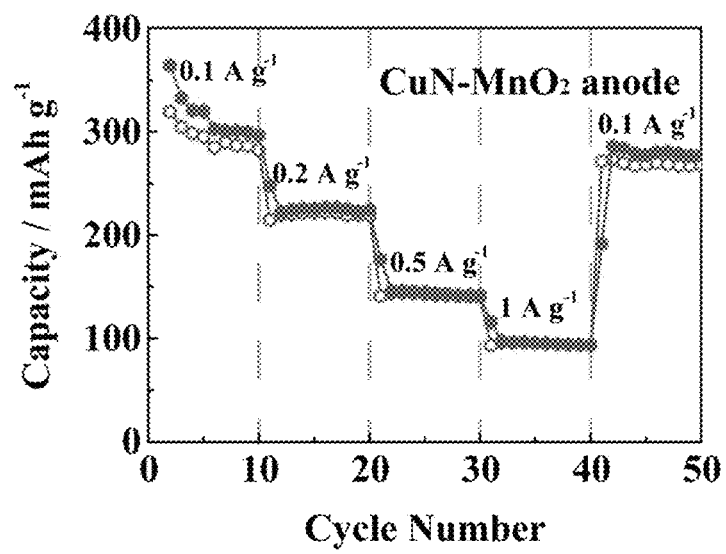
FIG. 15B shows the rate capability at different current densities of 0.1-2 A·g⁻¹ for CuN—MnO₂ electrode.

The electrochemical properties of the Cu—MnTFs were further evaluated by the rate capabilities of the CuL-$MnO_2$ and CuN—$MnO_2$ electrodes at different current densities after cyclic performance tests. As shown in FIGS. 15A and 15B, when the current densities are 0.1, 0.2, 0.5, 1 and 2 A·g$^{-1}$, the discharge specific capacities of CuL-$MnO_2$ electrode are measured as 1106, 925, 642, 469 and 309 mAh·g$^{-1}$ respectively. By returning to the initial current density of 0.1 A·g$^{-1}$, the discharge capacity recovers to 1164 (capacity retention: 105%) mAh·g$^{-1}$ and remains at 1067 (96%) mAh·g$^{-1}$ after 60 cycles, demonstrating a highly efficient transportation between the electrode/electrolyte interfaces. Similarly, the discharge specific capacities of the CuN—$MnO_2$ electrode are measured as 296, 225, 142 and 94 mAh·g$^{-1}$ at a current density of 0.1, 0.2, 0.5 and 1 A·g$^{-1}$ respectively and remains at 278 (94%) mAh·g$^{-1}$ after returning to 0.1 A·g$^{-1}$ at the 50th cycle.

Figure 16A:
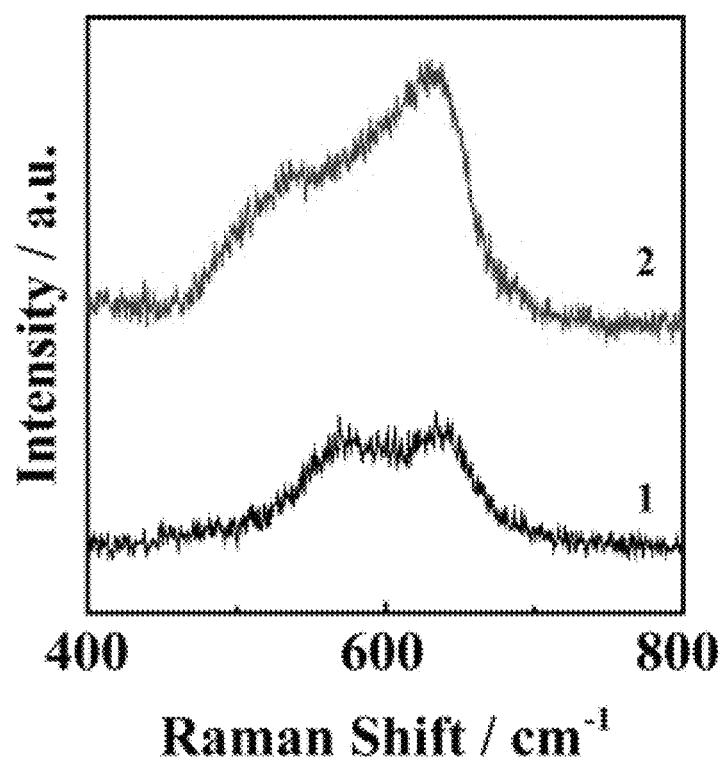
FIG. 16A shows the Raman Spectra of the CuL-MnO₂ electrode before and after 300 cycles at 0.32 A·g⁻¹.
Figure 16B:
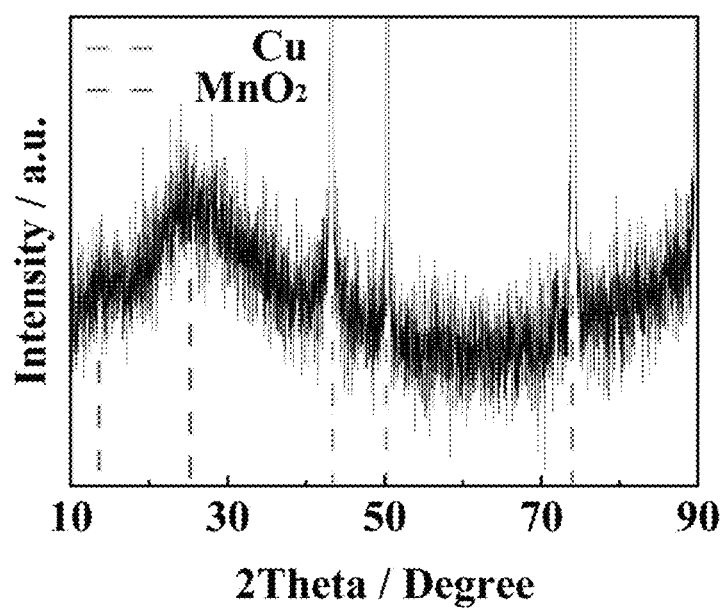
FIG. 16B shows the XRD pattern of the CuL-MnO₂ electrode after 300 cycles at 0.32 A·g⁻¹.
Figure 16C:
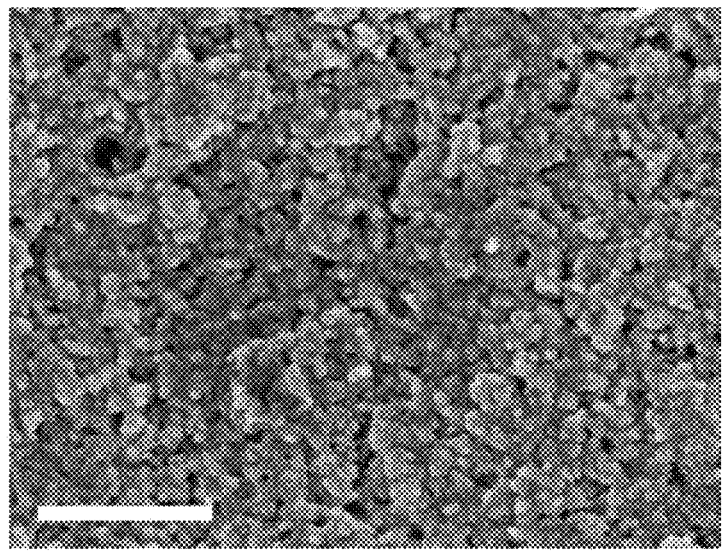
FIG. 16C shows the surface view of the SEM image of the CuL-MnO₂ electrode after 300 cycles at 0.32 A·g⁻¹. Scale bar is 500 nm.

The cyclic stability of CuL-$MnO_2$ electrode was also investigated. The Raman spectra of the CuL-$MnO_2$ electrode before and after 300 cycles are shown in FIG. 16A. Compared to the result of the CuL-$MnO_2$ electrode before cycling (marked by 1), both peaks after 300 charging/discharging cycles (marked by 2) exhibit an increasing of the intensity, demonstrating the improved crystallization of the $MnO_2$ phase. The XRD pattern of the CuL-$MnO_2$ electrode after the cycling test is exhibited in FIG. 16B. Two peaks at 13.5 and 25° could be assigned to the birnessite $MnO_2$ (JCPDS No. 80-1098), while another three sharp peaks at 44°, 51° and 74° could be assigned to the (111), (200) and (220) reflections of the copper foil (JCPDS No. 04-0836). The surface view of the SEM images of the CuL-$MnO_2$ electrode after cycling test are shown in FIG. 16C. Compared to the SEM images of the CuL-$MnO_2$ electrode before test in FIG. 4B, the porous structure could still be observed after test, which could be attributed to the robustness of the $MnO_2$ thin films.

Figure 17A:
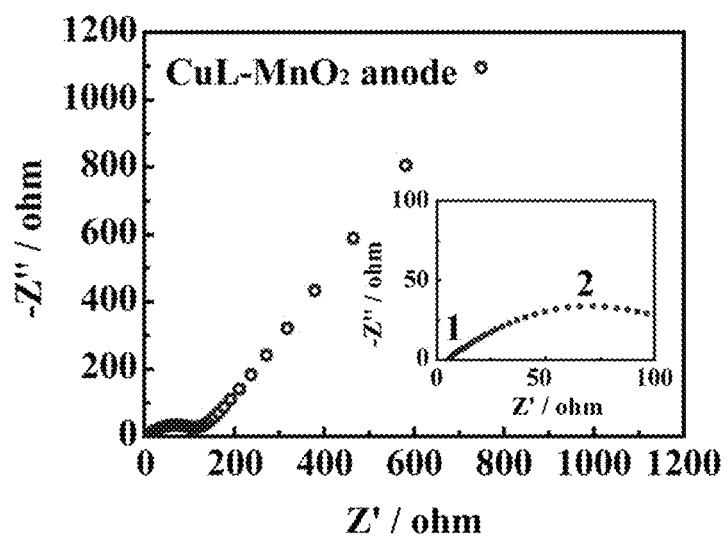
FIG. 17A shows the Nyquist plots of the CuL-MnO₂ electrode with an inset showing an enlarged spectrum at high frequency.
Figure 17B:
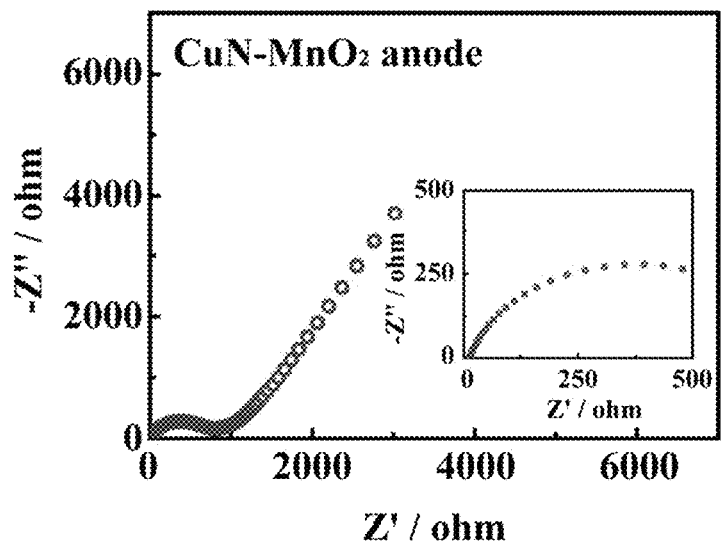
FIG. 17B shows the Nyquist plots of the CuN—MnO₂ electrode with an inset showing an enlarged spectrum at high frequency.

The Nyquist plots of the a-$MnO_2$ electrodes were measured. FIGS. 17A and 17B show the electrochemical characteristics of the Cu—$MnO_2$ electrodes. As the electrode for Li-ion batteries, the CuL-$MnO_2$ electrode consists of two semicircles (see the inset figure, marked by 1 and 2) at high and intermediate frequency region. These two semicircles are caused by the Li$^+$ ions transport through the SEI layer and the interfacial charge transfer reaction combined with the electrochemical double-layer capacitive behavior. In the low-frequency region, the curve shows a straight line with an angle ~45° to the real axis, which could be attributed to the solid-state Li diffusion into the active materials. On the contrary, the Nyquist plots of the CuN—$MnO_2$ electrode exhibits higher resistance due to the larger size of Na$^+$ ions.

Figure 18A:
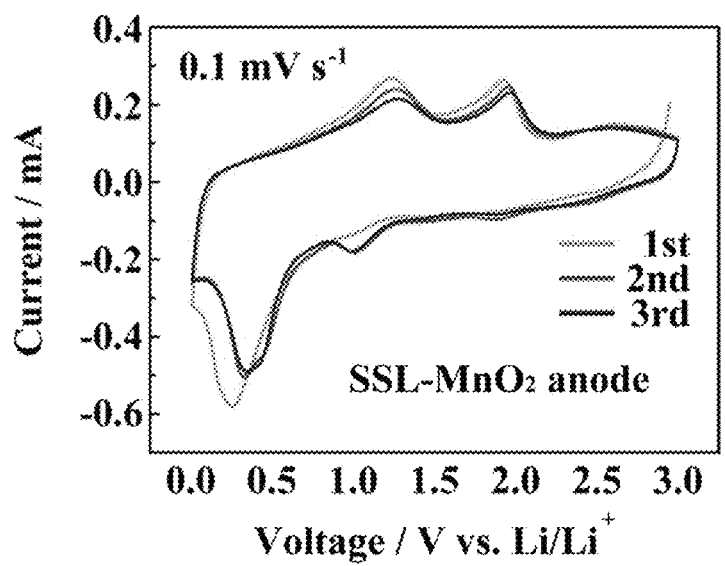
FIG. 18A depicts the CV profiles of the SSL-MnO₂ electrode al 0.1 mV·s⁻¹ between 0 and 3V.
Figure 19A:
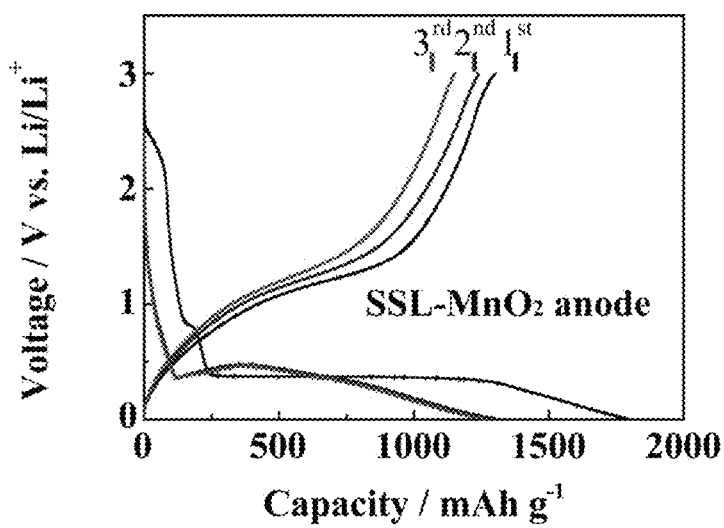
FIG. 19A shows the potential profile of the SSL-MnO$_2$ electrode during the 1st-3rd GCD cycles between 0 and 3 V at a current density of 0.25 A·g$^{-1}$.

The $1^{st}$-$3^{rd}$ cycles of the cyclic voltammogram (CV) profiles of the SSL-$MnO_2$ electrode in a voltage range of 0-3 V at 0.1 mV·s$^{-1}$ are shown in FIG. 18A. Similar to the result of CuL-$MnO_2$ electrode, the CV profiles of SSL-$MnO_2$ electrode shows a cathodic peak located at 0.3 V in the first negative scan process, which could be attributed to the reduction of $MnO_2$ and the formation of a solid electrolyte interphase (SEI) layer. From the second cycle, the peaks turn to 0.4 V, indicating an irreversible structural or textural modification. Two redox peaks at 1.3 and 2.0 V could be attributed to the two-step electrochemical redox reactions on electrode/electrolyte interfaces. Besides, it is obvious that the peaks of the SSL-MnO$_2$ electrode after the second CV curves are nearly unchanged, demonstrating excellent structural stability and electrochemical reversibility. To confirm the results of the CV curves, the 1st-3rd galvanostatic charge/discharge (GCD) cycles of the SSL-MnO$_2$ electrode at 0.25 A·g$^{-1}$ are shown in FIG. 19A. A plateau appeared at ~0.35 V in the first discharge process due to the irreversible reactions process, which is consistent with the results of the CV curves. The following discharge curves exhibit sharp decrease in voltage from the open-circuit potential to ~0.5 V due to a very small amount of Li ions insertion. From 0.5-0.3 V, a plateau appeared which is caused by the insertion process of Li ions into the SSL-MnO$_2$ electrode. Due to the formation of buserite-type MnO$_2$ during the 1st charge cycle according to the prior reports (T. Suga et al, Chem. Commun. 2007, 1730-1732.), a slightly increase of the voltage could be observed in the 2$^{nd}$ and 3$^{rd}$ discharge cycles. The final gradual decay at 0.3-0 V represents the fully insertion of Li ions into the surface of the electrode.

Figure 18B:
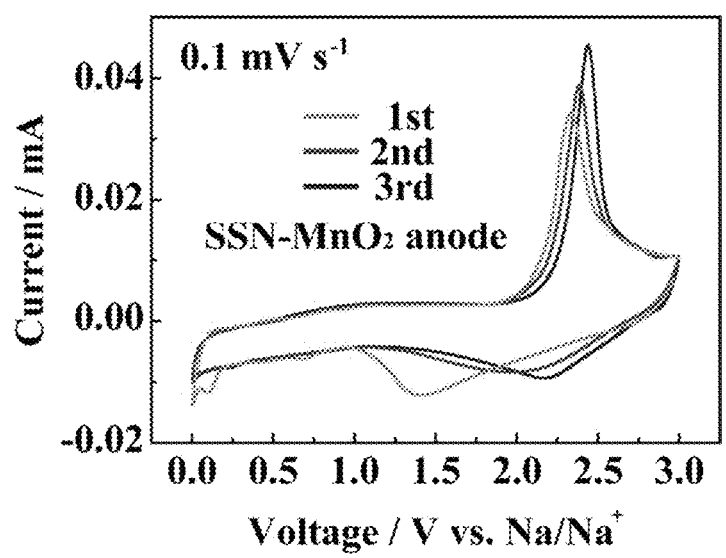
FIG. 18B depicts the CV profiles of the SSN—MnO$_2$ electrode at 0.1 mV·s$^{-1}$ between 0 and 3V.

On the other hand, the 1$^{st}$-3$^{rd}$ CV cycles of the SSN—MnO$_2$ electrode in a voltage range of 0-3 V at 0.1 mV·s$^{-1}$ are shown in FIG. 18B. The first discharge cycle exhibits a board peak at ~1.5V and an obvious angle at 0-0.5V due to the SEI layer formation. In the 2$^{nd}$ and 3$^{rd}$ cycles, the peak at 1.5V moved to ~2.2V and the peak located at 0-0.5V disappeared. The 1$^{st}$-3$^{rd}$ charge cycles all exhibit sharp peaks at 2.3V during the de-sodiation process.

Figure 19B:
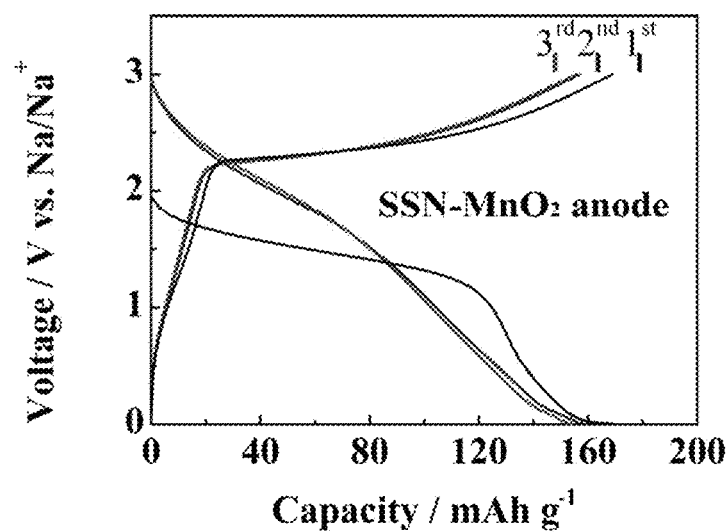
FIG. 19B shows the potential profile of the SSN—MnO$_2$ electrode during the 1st-3rd GCD cycles between 0 and 3 V at a current density of 0.25 A·g$^{-1}$.

As shown in FIG. 19B, the 1$^{st}$ discharge GCD cycle of SSN—MnO$_2$ electrode confirm the CV result with a plateau at ~1.5V and a slow decay at 0.5-0V related to the SEI layer formation. The following discharge and charge cycles remained unchanged and also matched the results of CV profiles.

Figure 20:
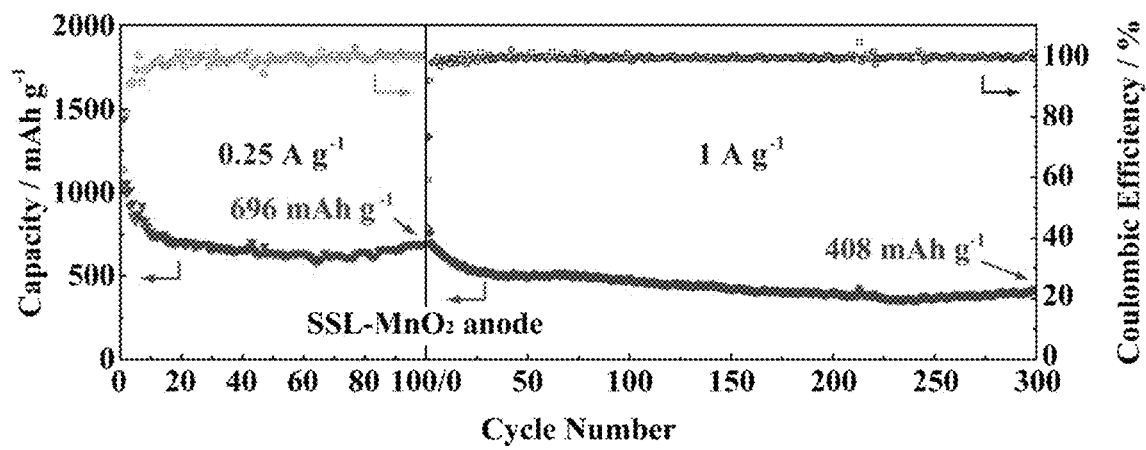
FIG. 20 shows the cyclic performance and coulombic efficiency of the SSL-MnO$_2$ electrode at the current densities of 0.25 and 1 A·g$^{-1}$ respectively.

Half cells were assembled by using SSL-MnO$_2$ and SSN—MnO$_2$ electrodes and Li/Na foils as the working and counter electrodes. FIG. 20 shows the cyclic performances and coulombic efficiencies of the SSL-MnO$_2$ electrode at 0.25 and 1 A·g$^{-1}$ respectively. When the current density of 0.25 A·g$^{-1}$ is applied, the initial charge and discharge specific capacity are about 1040 and 1440 mAh·g$^{-1}$ with a coulombic efficiency of 63%. The high irreversible capacity is caused by (i) the irreversible conversion reaction of the MnO$_2$ by Li ions, and (ii) the formation of solid-electrolyte interfaces (SEI) layer by electrolyte decomposition. After that, the discharge capacity decreased slowly to 768 mAh·g$^{-1}$ after 10 cycles and maintained at ~700 mAh·g$^{-1}$ with nearly 100% in the following 100 cycles. If a high current density of 1 A·g$^{-1}$ is applied, a coulombic efficiency of 73% could be reached for the first cycle and the discharge capacity could still remain at 408 mAh·g$^{-1}$ with a coulombic efficiency of 99.3% after 300 cycles, indicating a long term cycling stability of the SSL-MnO$_2$ electrode. To confirm the cyclic stability of SSL-MnO$_2$ electrode, the Li-ion half-cell after testing at 1 A·g$^{-1}$ for 300 cycles was unpacked to check the surface morphology and structure, as shown in FIG. 4C. The SEM image show a porous structure of the MnTFs without significant changes, demonstrating the cyclic stability of the SSL-MnO$_2$ electrode.

Figure 21:
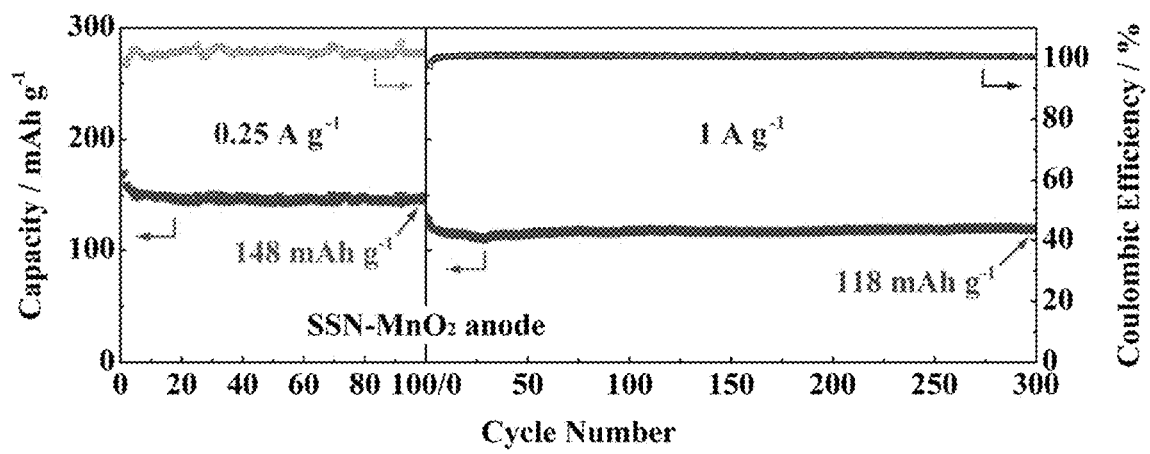
FIG. 21 shows the cyclic performance and coulombic efficiency of the SSN—MnO$_2$ electrode al the current densities of 0.25 and 1 A·g$^{-1}$ respectively.

Similarly with the results of SSL-MnO$_2$ electrode, the cycling performances of SSN—MnO$_2$ electrode in FIG. 21 exhibits a straight line with discharge capacities of 148 mAh·g$^{-1}$ after 100 cycles at 0.25 A·g$^{-1}$ and 118 mAh·g$^{-1}$ after 300 cycles at 1 A·g$^{-1}$ respectively, which could be comparable or higher than other Na-ion battery electrodes such as MnO$_2$ nanoflowers and nanorods reported recently in Table 2. Notably, the coulombic efficiencies of the SSN—MnO$_2$ electrodes show ~100% during all the cycles at both 0.25 and 1 A·g$^{-1}$, demonstrating the highly reversibility of the SSN—MnO$_2$ electrodes.

Figure 22:
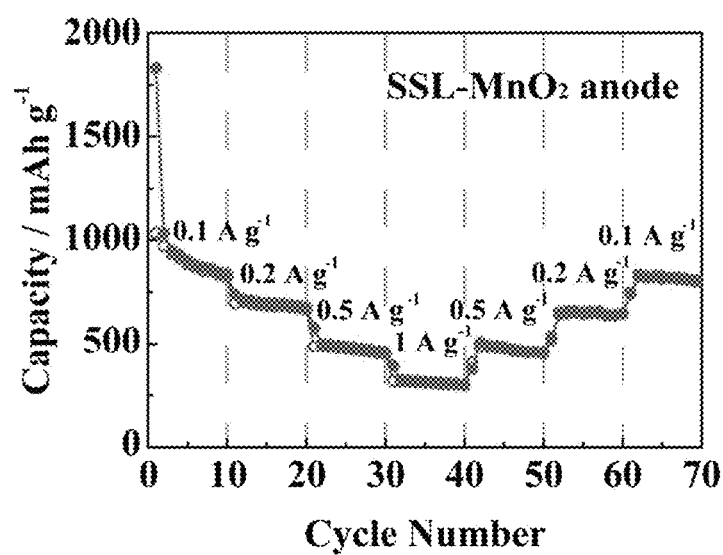
FIG. 22 shows the rate capability at different current densities of 0.1-1 A·g$^{-1}$ for SSL-MnO$_2$ electrode.
Figure 23:
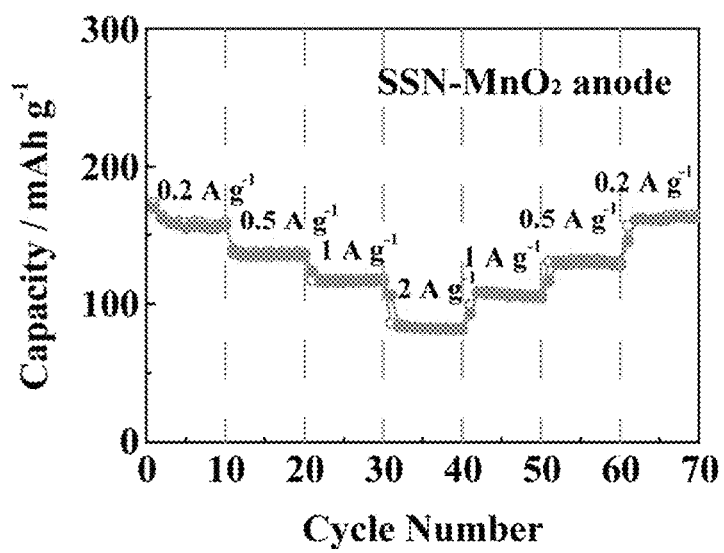
FIG. 23 shows the rate capability at different current densities of 0.2-2 A·g$^{-1}$ for SSN—MnO$_2$ electrode.

The electrochemical properties of the MnTFs were further evaluated by the rate capabilities of the SSL-MnO$_2$ and SSN—MnO$_2$ electrodes at different current densities. As shown in FIG. 22, when the current densities are 0.1, 0.2, 0.5 and 1 A·g$^{-1}$, the discharge specific capacities of SSL-MnO$_2$ electrode are measured as 843, 675, 459 and 303 mAh·g$^{-1}$ respectively, which could be on the same level of the CuL-MnO$_2$ electrode. By returning to the initial current density of 0.5, 0.2 and 0.1 A·g$^{-1}$, the SSL-MnO$_2$ electrode shows capacity retentions of 99.8%, 96% and 95.4% respectively. Similarly, the discharge specific capacities of the SSN—MnO$_2$ electrode are measured as 156, 135, 117 and 82 mAh·g$^{-1}$ at a current density of 0.2, 0.5, 1 and 2 A·g$^{-1}$ respectively and recovered to 105, 128 and 162 mAh·g$^{-1}$ after returning to 1, 0.5 and 0.2 A·g$^{-1}$ respectively, as shown in FIG. 23. The rating performance could be attributed to the finite-size effect of the MnO$_2$ nanosheets.

Figure 24A:
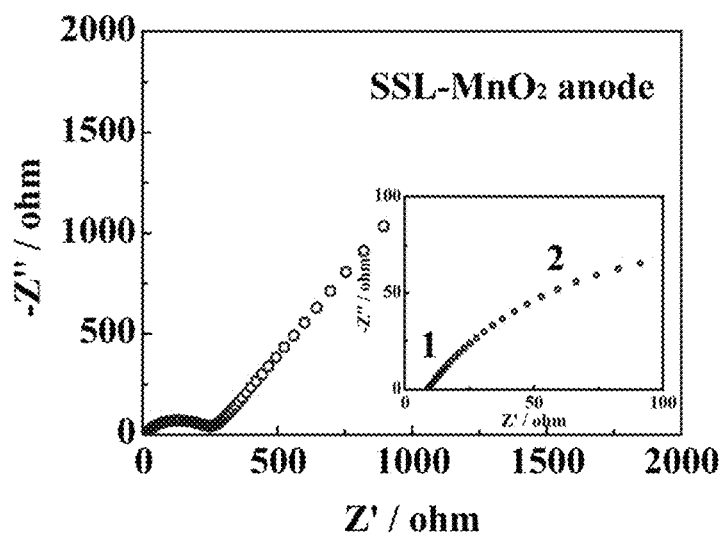
FIG. 24A shows the Nyquist plots of the SSL-MnO$_2$ electrode with an inset showing an enlarged spectrum at high frequency.

As shown in FIG. 24A, the Nyquist plots of the SSL-MnO$_2$ electrode consists of two semicircles (see the inset figure, marked by 1 and 2) at high and intermediate frequency region. Similar to the EIS spectrum of the CuL-MnO$_2$ electrode, these two semicircles are caused by the Li$^+$ ions transport through the SEI layer and the interfacial charge transfer reaction combined with the electrochemical double-layer capacitive behavior. In the low-frequency region, the curve shows a straight line with an angle ~45° to the real axis, which could be attributed to the solid-state Li diffusion into the active materials.

The fitted impedance parameters of Cu-based and SS-based MnO$_2$ electrodes are listed in the Table 3. Notably, the RSEI values of CuL and SSL-MnO$_2$ electrodes could be even lower than reported graphene/MnO$_2$/graphene nanoribbons composite electrode (15.450), indicating a rapid transportation of Li$^+$ ions through the SEI layer due to the porous structure of the electrode.

Figure 24B:
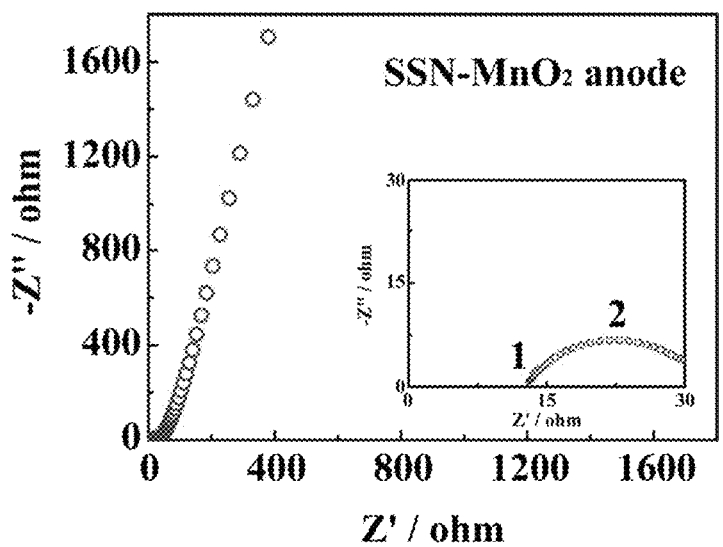
FIG. 24B shows the Nyquist plots of the SSN—MnO$_2$ electrode with an inset showing an enlarged spectrum at high frequency.
Figure 25:
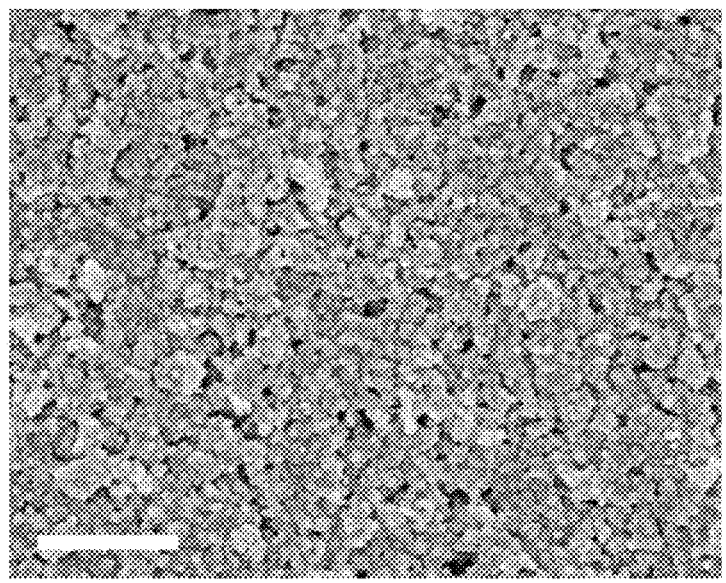
FIG. 25 shows the surface view of the SEM image of the SSL-MnO$_2$ electrode after 100 cycles at 0.25 A·g$^{-1}$. Scale bar is 500 nm.

In addition, compared to the EIS results of the CuN—MnO$_2$ electrode, the Nyquist plots of the SSN—MnO$_2$ electrode exhibits much lower resistance due to the merits of ether-based electrolyte, as shown in FIG. 24B.

A comparison between cyclic performances and energy densities between Cu/SS—MnO$_2$ electrodes and other MnO$_2$-based electrodes are summarized in Table 2 below.

TABLE 2

| Ref. | Materials | Type | Cycle Number | Discharge Capacity/ mAh · g$^{-1}$ | Current Density/ A · g$^{-1}$ | Energy Density/ Wh · kg$^{-1}$ |
|---|---|---|---|---|---|---|
| CE-A | MnO$_2$/nitrogen-doped graphene hybrid aerogel composite | LIB | 200 | 909 | 0.4 | 2727 |

TABLE 2-continued

| Ref. | Materials | Type | Cycle Number | Discharge Capacity/ mAh·g⁻¹ | Current Density/ A·g⁻¹ | Energy Density/ Wh·kg⁻¹ |
|---|---|---|---|---|---|---|
| CE-B | 3D porous graphene/MnO$_2$ composite | LIB | 200 | 786 | 0.1 | 2358 |
| CE-C | MnO$_2$/hollow carbon spheres composite | LIB | 500 | 420 | 1 | 1260 |
| CE-D | MnO$_2$/N-doped graphene composite | LIB | 3000 | ~375 | 2.5 | 1125 |
| CE-E | graphene/MnO$_2$/graphene nanoribbons | LIB | 250 | 612 | 0.4 | 1836 |
| Embodiment described herein | Cu—MnO$_2$ anode | LIB | 300 | 1116 | 0.32 | 3348 |
| | | | 600 | 1322 | 1 | 3966 |
| | SSL—MnO$_2$ anode | LIB | 100 | 696 | 0.25 | 2088 |
| | | | 300 | 408 | 1 | 1224 |
| CE-F | MnO$_2$ nanorods | SIB | 100 | 129.2 | 0.05 | 387.6 |
| CE-G | MnO$_2$ nanoflowers | SIB | 1000 | 133.6 | 0.4 | 400.8 |
| Embodiment of described herein | CuN—MnO$_2$ anode | SIB | 100 | 134 | 0.32 | 402 |
| | | | 100 | 78 | 1 | 234 |
| | SSN—MnO$_2$ anode | SIB | 100 | 148 | 0.25 | 444 |
| | | | 300 | 118 | 1 | 354 |

TABLE 3

The EIS simulation parameters of the Cu/SS-MnO$_2$ anodes and other anodes.

| Ref. | Anodes | $R_s$/Ω | $C_{SEI}$/μF | $R_{SEI}$/Ω | $R_{ct}$/Ω | $C_{dl}$/μF | $Z_w$/Ω |
|---|---|---|---|---|---|---|---|
| CE-E | MnO$_2$/graphene | 2.95 | 34.74 | 16.64 | 69.38 | 11.24 | 24.49 |
| | graphene/MnO$_2$/graphene nanoribbons | 3.36 | 81.11 | 15.45 | 45.35 | 26.82 | 129.45 |
| Embodiment described herein | CuL—MnO$_2$ | 5.428 | 1.136 | 4.039 | 84.01 | 43.31 | 157.4 |
| | SSL—MnO$_2$ | 8.711 | 6.959 | 0.152 | 214.4 | 34.3 | 128.3 |
| | CuN—MnO$_2$ | 10.23 | 1.16 | 2.45 | 624.8 | 3.79 | 1233 |
| | SSN—MnO$_2$ | 12.79 | 1.634 | 4.194 | 8.379 | 0.636 | 88.18 |

Advantageously the present disclosure teaches a scalable method of preparing MnO$_2$ electrode on different substrates addressing at least one or more of the deficiencies of prior art methods, which allows the assembly of MnO$_2$-based batteries more efficiently and at a lower production cost.

The specific embodiments described herein are meant to be exemplary only, and various modifications will be apparent to those skilled in the art. The claims below are intended to cover all such modifications that fall within the true spirit and scope of the invention.

The invention claimed is:

1. An MnO$_2$ electrode comprising:
   a substrate at least partially coated with MnO$_2$ nanosheets (MnNSs) forming additive free MnO$_2$ thin films, wherein the MnO$_2$ thin films are characterized by one of the following thin film X-ray diffraction patterns (2-theta):
   a X-ray diffraction pattern (2-theta) having a single peak at about 12.5 degrees;
   a X-ray diffraction pattern (2-theta) having only two peaks at about 12.5 and 36 degrees; or
   a X-ray diffraction pattern (2-theta) having only two peaks at about 12.5 and 25 degrees; and
   wherein the MnO$_2$ nanosheets have diameters less than 50 nm.

2. The MnO$_2$ electrode according to claim 1, wherein the substrate is selected from the group consisting of copper foil, carbon fiber cloth, stainless steel, graphene foam, copper foam, aluminium foil and carbon fiber cloth.

3. The MnO$_2$ electrode according to claim 1, wherein the substrate is selected from the group consisting of copper foam, copper foil and graphene foam, and the MnO$_2$ thin films are annealed at 260-320° C. in vacuum for at least 100 minutes.

4. The MnO$_2$ electrode according to claim 1, wherein the substrate is selected from the group consisting of stainless steel and carbon fiber cloth (carbon fabrics), and the MnO$_2$ thin films are annealed at 260-320° C. in air for at least 100 minutes.

5. The MnO$_2$ electrode according to claim 1, wherein the substrate is coated by either drop coating, spray printing or inkjet printing with MnO$_2$ nanosheets.

6. The MnO$_2$ electrode according to claim 1, wherein the substrate is selected from the group consisting of copper foam, copper foil and graphene foam, and the MnO$_2$ thin films are annealed at 260-320° C. in vacuum for 110-130 minutes.

7. The MnO$_2$ electrode according to claim 1, wherein the substrate is selected from the group consisting of copper foam, copper foil and graphene foam, and the MnO$_2$ thin films are annealed at 260-320° C. in vacuum for 115-125 minutes.

8. The MnO$_2$ electrode according to claim 1, wherein the substrate is selected from the group consisting of copper foam, copper foil and graphene foam, and the MnO$_2$ thin films are annealed at 275-310° C. in vacuum for at least 100 minutes.

9. The MnO$_2$ electrode according to claim 1, wherein the substrate is selected from the group consisting of copper foam, copper foil and graphene foam, and the MnO$_2$ thin films are annealed at 275-310° C. in vacuum for 110-130 minutes.

10. The MnO$_2$ electrode according to claim 1, wherein the substrate is selected from the group consisting of copper foam, copper foil and graphene foam, and the MnO$_2$ thin films are annealed at 275-310° C. in vacuum for 115-125 minutes.

11. The MnO$_2$ electrode according to claim 1, wherein the substrate is selected from the group consisting of copper foam, copper foil and graphene foam, and the MnO$_2$ thin films are annealed at 290-300° C. in vacuum for at least 100 minutes.

12. The MnO$_2$ electrode according to claim 1, wherein the substrate is selected from the group consisting of copper foam, copper foil and graphene foam, and the MnO$_2$ thin films are annealed at 290-300° C. in vacuum for 110-130 minutes.

13. The MnO$_2$ electrode according to claim 1, wherein the substrate is selected from the group consisting of copper foam, copper foil and graphene foam, and the MnO$_2$ thin films are annealed at 290-300° C. in vacuum for 115-125 minutes.

14. The MnO$_2$ electrode according to claim 1, wherein the substrate is selected from the group consisting of stainless steel sheet and carbon fiber cloth (carbon fabrics), and the MnO$_2$ thin films are annealed at 260-320° C. in air for 110-130 minutes.

15. The MnO$_2$ electrode according to claim 1, wherein the substrate is selected from the group consisting of stainless steel sheet and carbon fiber cloth (carbon fabrics), and the MnO$_2$ thin films are annealed at 260-320° C. in air for 115-125 minutes.

16. The MnO$_2$ electrode according to claim 1, wherein the substrate is selected from the group consisting of stainless steel sheet and carbon fiber cloth (carbon fabrics), and the MnO$_2$ thin films are annealed at 275-310° C. in air for at least 100 minutes.

17. The MnO$_2$ electrode according to claim 1, wherein the substrate is selected from the group consisting of stainless steel sheet and carbon fiber cloth (carbon fabrics), and the MnO$_2$ thin films are annealed at 275-310° C. in air for 110-130 minutes.

18. The MnO$_2$ electrode according to claim 1, wherein the substrate is selected from the group consisting of stainless steel sheet and carbon fiber cloth (carbon fabrics), and the MnO$_2$ thin films are annealed at 275-310° C. in air for 115-125 minutes.

19. The MnO$_2$ electrode according to claim 1, wherein the substrate is selected from the group consisting of stainless steel sheet and carbon fiber cloth (carbon fabrics), and the MnO$_2$ thin films are annealed at 290-300° C. in air for at least 100 minutes.

20. The MnO$_2$ electrode according to claim 1, wherein the substrate is selected from the group consisting of stainless steel sheet and carbon fiber cloth (carbon fabrics), and the MnO$_2$ thin films are annealed at 290-300° C. in air for 110-130 minutes.

21. The MnO$_2$ electrode according to claim 1, wherein the substrate is selected from the group consisting of stainless steel sheet and carbon fiber cloth (carbon fabrics), and the MnO$_2$ thin films are annealed at 290-300° C. in air for 115-125 minutes.

22. An energy storage device comprising:
    an MnO$_2$ electrode that comprises a substrate at least partially coated with MnO$_2$ nanosheets (MnNSs) forming additive free MnO$_2$ thin films, wherein the MnO$_2$ thin films are characterized by one of the following thin film X-ray diffraction patterns (2-theta):
        a X-ray diffraction pattern (2-theta) having a single peak at about 12.5 degrees;
        a X-ray diffraction pattern (2-theta) having only two peaks at about 12.5 and 36 degrees; or
        a X-ray diffraction pattern (2-theta) having only two peaks at about 12.5 and 25 degrees; and
    wherein the MnO$_2$ nanosheets have diameters less than 50 nm.

23. The energy storage device according to claim 22, further comprising:
    a Li metal counter electrode; and
    a Li-containing electrolyte, the MnO$_2$ electrode, the Li metal counter electrode, and the Li-containing electrolyte which form an Li-ion cell.

24. The energy storage device according to claim 23, wherein the Li-containing electrolyte is selected from: 1.0 mol·L$^{-1}$ LiPF$_6$ in ethylene carbonate (EC) and dimethyl carbonate (DMC) (EC:DMC, 1:1 vol %), 1.0 mol·L$^{-1}$ LiPF$_6$ in EC/diethyl carbonate (DEC) (EC:DEC, 1:1 vol %), 0.5 mol·L$^{-1}$ LiCF$_3$SO$_3$ and 0.5 mol·L$^{-1}$ LiNO$_3$ in diethylene glycol dimethyl ether (DEGDME) as the electrolyte.

25. The energy storage device of claim 22, further comprising:
    a Na metal counter electrode; and
    a Na-containing electrolyte, the MnO$_2$ electrode, the Na metal counter electrode, and the Na-containing electrolyte which form a Na-ion cell.

26. The energy storage device according to claim 25, wherein the Na-containing electrolyte is selected from: 1.0 mol·L$^{-1}$ NaClO$_4$ s dissolved in propylene carbonate (PC) with addition of 5% fluoroethylene carbonate (FEC), 1.0 mol·L$^{-1}$ NaCF$_3$SO$_3$ dissolved in DEGDME, 1.0 mol L$^{-1}$ NaCF$_3$SO$_3$ dissolved in ethylene carbonate and diethyl carbonate (EC/DEC), and 1.0 mol·L$^{-1}$ NaCF$_3$SO$_3$ dissolved in propylene carbonate (PC).

\* \* \* \* \*